(12) United States Patent
Lin et al.

(10) Patent No.: US 11,943,785 B2
(45) Date of Patent: Mar. 26, 2024

(54) METHOD AND APPARATUS FOR PDCCH MONITORING

(71) Applicant: FG Innovation Company Limited, Tuen Mun (HK)

(72) Inventors: Wan-Chen Lin, Taipei (TW); Chie-Ming Chou, Taipei (TW); Tsung-Hua Tsai, Taipei (TW); Yu-Hsin Cheng, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 98 days.

(21) Appl. No.: 17/511,098

(22) Filed: Oct. 26, 2021

(65) Prior Publication Data

US 2022/0046616 A1 Feb. 10, 2022

Related U.S. Application Data

(63) Continuation of application No. 16/694,967, filed on Nov. 25, 2019, now Pat. No. 11,197,288.

(60) Provisional application No. 62/771,254, filed on Nov. 26, 2018.

(51) Int. Cl.
*H04W 72/23* (2023.01)
*H04W 72/56* (2023.01)

(52) U.S. Cl.
CPC ........... *H04W 72/23* (2023.01); *H04W 72/56* (2023.01)

(58) Field of Classification Search
CPC ......... H04W 72/1273; H04W 72/1268; H04W 72/23; H04W 72/10; H04W 24/08; H04W 72/56; H04W 72/042; H04W 72/0446; H04W 76/27; H04W 72/11; H04L 5/0055; H04L 5/005
See application file for complete search history.

(56) References Cited

U.S. PATENT DOCUMENTS 9,729,295 B2 * 8/2017 Zhang .................... H04L 1/1861
2012/0213196 A1 * 8/2012 Chung .................. H04L 5/0007
370/336
2019/0159230 A1 5/2019 Kim et al.
2019/0306737 A1 10/2019 Kwak et al.
(Continued)

FOREIGN PATENT DOCUMENTS

CN 102625457 A 8/2012
CN 105939183 A 9/2016

OTHER PUBLICATIONS

LG Electronics, "Discussion on layer 1 enhancements for URLLC", R1-1810294, 3GPP TSG RAN WG1 Meeting #94bis, Chengdu, China, Oct. 8-12, 2018, XP051517708, sections 2-6.
(Continued)

*Primary Examiner* — Wei Zhao
(74) *Attorney, Agent, or Firm* — ScienBiziP, P.C.

(57) ABSTRACT

A method for PDCCH monitoring performed by a UE is provided. The method includes performing the PDCCH monitoring in a first group associated with at least one first PDCCH monitoring configuration; receiving, from a base station, DCI comprising an indicator; performing the PDCCH monitoring in a second group associated with at least one second PDCCH monitoring configuration; and stopping the PDCCH monitoring in the first group after receiving the indicator.

12 Claims, 15 Drawing Sheets

(56) References Cited

U.S. PATENT DOCUMENTS

2020/0154467 A1* 5/2020 Gong .................... H04W 24/08
2020/0367253 A1* 11/2020 Kim ..................... H04W 24/08

OTHER PUBLICATIONS

MediaTek Inc., "Evaluations and enhancements of NR control channels for URLLC", R1-1810463, 3GPP TSG RAN WG1 Meeting #94bis, Chengdu, China, Oct. 8-12, 2018, XP051517872, sections 3-5.

* cited by examiner

METHOD AND APPARATUS FOR PDCCH MONITORING

CROSS-REFERENCE TO RELATED APPLICATION(S)

The present application is a continuation application of U.S. patent application Ser. No. 16/694,967, filed on Nov. 25, 2019, which claims the benefit of and priority to U.S. Provisional Patent Application Ser. No. 62/771,254, filed on Nov. 26, 2018, entitled "Sub-slot Design for Enhanced PDCCH Monitoring," the contents of all of which are hereby incorporated herein fully by reference into the present application.

FIELD

The present disclosure generally relates to wireless communication, and more particularly, to Physical Downlink Control Channel (PDCCH) monitoring in the next generation wireless communication networks.

BACKGROUND

Various efforts have been made to improve different aspects of wireless communications, such as data rate, latency, reliability and mobility, for the next generation (e.g., fifth generation (5G) New Radio (NR)) wireless communication systems. Three main applications in 5G include enhanced Mobile Broadband (eMBB), Ultra-Reliable Low Latency Communications (URLLC), and massive Machine-Type Communication (mMTC). Since the physical resource for the URLLC service is limited, and the reliability requirement for URLLC is much higher than eMBB, allocating physical resource for scheduling URLLC data may become challenging. In addition, eMBB data and URLLC data may coexist in some use cases, and thus a user equipment (UE) may need to simultaneously deal with both eMBB and URLLC scheduling. There is a need in the industry for an improved and efficient mechanism for the UE to handle PDCCH monitoring for scheduling URLLC data and eMBB data.

SUMMARY

The present disclosure is directed to a method for PDCCH monitoring performed by a UE in the next generation wireless communication networks.

According to an aspect of the present disclosure, a UE performing PDCCH monitoring is provided. The UE includes one or more non-transitory computer-readable media having computer-executable instructions embodied thereon and at least one processor coupled to the one or more non-transitory computer-readable media. The at least one processor is configured to execute the computer-executable instructions to: perform the PDCCH monitoring in a first group associated with at least one first PDCCH monitoring configuration; receive, from a base station, downlink control information (DCI) comprising an indicator; perform the PDCCH monitoring in a second group associated with at least one second PDCCH monitoring configuration; and stop the PDCCH monitoring in the first group after receiving the indicator.

According to another aspect of the present disclosure, a method for PDCCH monitoring performed by a UE is provided. The method includes performing the PDCCH monitoring in a first group associated with at least one first PDCCH monitoring configuration; receiving, from a base station, DCI comprising an indicator; performing the PDCCH monitoring in a second group associated with at least one second PDCCH monitoring configuration; and stopping the PDCCH monitoring in the first group after receiving the indicator.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
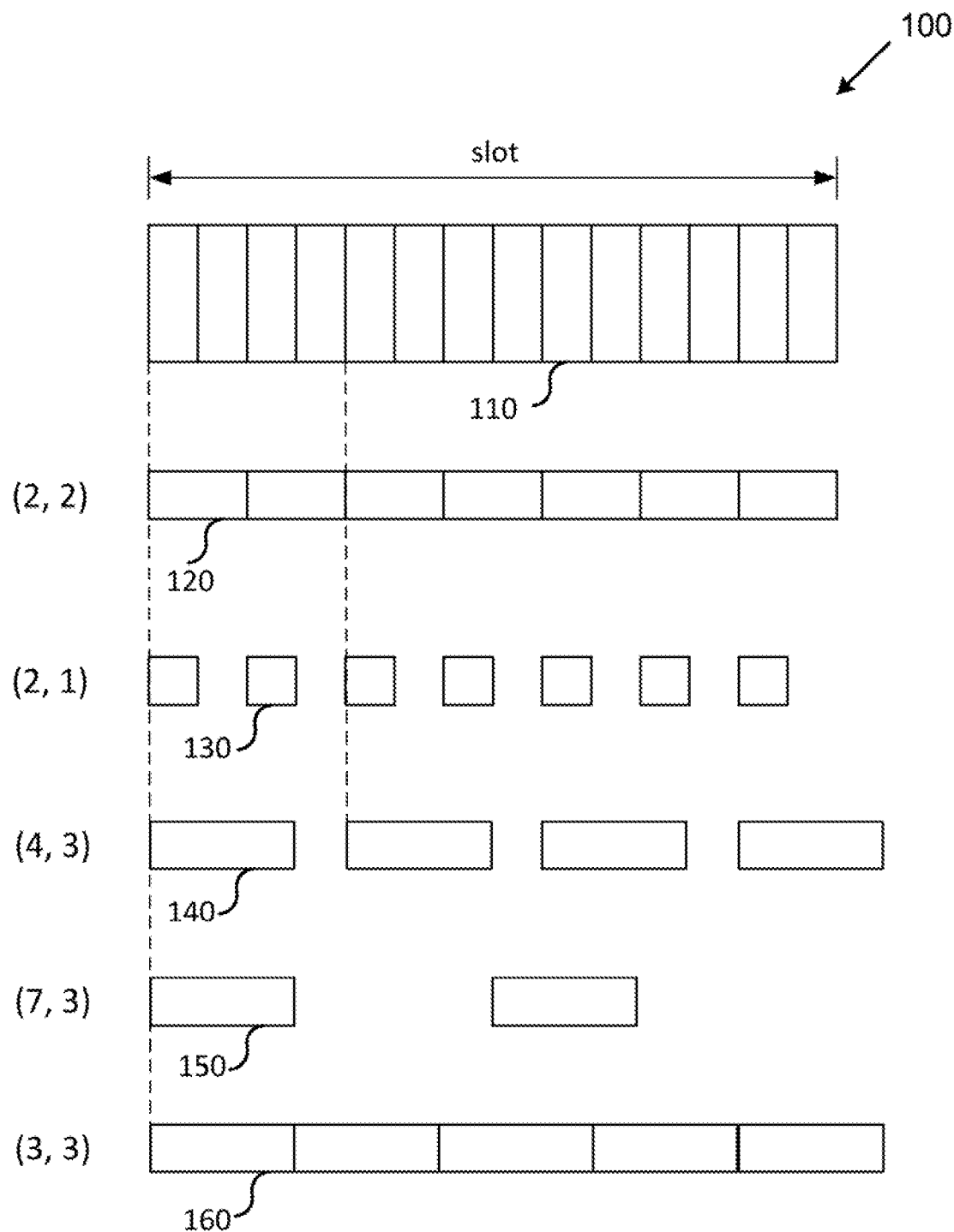
FIG. 1 includes a diagram illustrating an example representation of monitoring spans, according to an example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GERAN, a ng-eNB as in an E-UTRA base station in connection with the 5GC, a next generation Node B (gNB) as in the 5G-RAN, and any other apparatus capable of controlling radio communication and managing radio resources within a cell. The base station may serve one or more UEs through a radio interface.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

A PDCCH search space may refer to an area in a downlink resource grid where PDCCH may be carried. A UE may perform blind decoding in the search space to find PDCCH data (e.g., Downlink Control Information (DCI)). In one implementation, for each numerology $\mu$ (e.g., for each subcarrier spacing configuration), there may be a limit on the maximum number of monitored PDCCH candidates (e.g., blind decodes (BDs)) and non-overlapped control channel elements (CCEs) per slot for a single serving cell. A radio frame (e.g., 10 ms) may include 10 subframes, and each subframe (e.g., 1 ms) may include 1/2/4/8 slots when $\mu$ is 0/1/2/3. Table 1 below lists an example limit on the maximum number of PDCCH candidates and non-overlapped CCEs per slot for a downlink (DL) bandwidth part (BWP) with different numerologies

TABLE 1

| $\mu$ | Maximum number of PDCCH candidates per slot and per serving cell | Maximum number of non-overlapped CCEs per slot and per serving cell |
| --- | --- | --- |
| 0 | 44 | 56 |
| 1 | 36 | 56 |
| 2 | 22 | 48 |
| 3 | 20 | 32 |

For a higher reliable service, such as URLLC, a UE may monitor PDCCH more frequently to achieve the requirement of low latency and ensure PDCCH reliability. For example, to fulfil a more stringent latency constraint and guarantee the reliability of PDCCH reception, a system that has a higher capacity of blind detection and channel estimation than what is shown in Table 1 above may be supported in some of the present implementations. In one implementation, the limit of non-overlapped CCEs per slot may be different for the URLLC service and the enhanced Mobile Broadband (eMBB) service. In one implementation, the limit of monitored PDCCH candidates (e.g., BDs) per slot may be different for the URLLC service and the eMBB service.

In one implementation, the maximum number of BDs and CCEs may be configured per half slot. For example, the numbers in Table 1 above may be unchanged, but the numbers may indicate the limits per half slot instead. In one implementation, the limit of BDs and CCEs may be configured based on sub-slot granularity or monitoring occasions within a slot. In one implementation, the limit of BDs and CCEs for the URLLC service may be configured based on sub-slot granularity or monitoring occasions within a slot (e.g., non-slot based), whereas the limit of BDs and CCEs for the eMBB service may be configured per slot (e.g., slot-based).

Simultaneous scheduling slot-based PDCCH monitoring and non-slot based PDCCH monitoring (e.g., multiple PDCCH monitoring occasions within a slot) may be achievable by introducing different distribution of PDCCH candidates within a slot. For example, the number of BDs in each monitoring occasion for a shortened transmission time interval (sTTI) may be different. For the eMBB service, PDCCH candidates may be normally distributed on the first three symbols, and hence more PDCCH candidates may be allocated in the first PDCCH monitoring occasion when eMBB and URLLC are scheduled with different monitoring occasions. In one implementation, when simultaneous URLLC and eMBB scheduling is supported, different PDCCH monitoring occasions may be needed within a slot. However, it may not be necessary to monitor PDCCH candidates in such a frequent way when there is only the eMBB service. Thus, in one implementation, a slot may be divided into multiple sub-slots to avoid wasting power on monitoring PDCCH continually. A sub-slot may correspond to a PDCCH monitoring span.

In one implementation, a slot may include multiple PDCCH monitoring spans. A UE may receive a PDCCH monitoring configuration, and each PDCCH monitoring occasion allocated by the PDCCH monitoring configuration may be fully contained in one of the PDCCH monitoring spans. In one implementation, a PDCCH monitoring capability of the UE may include a duplet (X, Y) or a triplet (X, Y, $\mu$), where X is the minimum time separation between the start of two PDCCH monitoring spans, Y is the length of each PDCCH monitoring span, and $\mu$ is the numerology. X and Y may be in unit of symbols. In one implementation, the PDCCH monitoring capability may also include an indication whether a granularity of the limit of BDs and CCEs is slot-based or non-slot based (e.g., BD/CCE limit is configured per PDCCH monitoring span).

FIG. 1 includes a diagram 100 illustrating an example representation of monitoring spans, according to an example implementation of the present application. In the example shown in FIG. 1, one slot may include fourteen symbols 110. For a PDCCH monitoring capability (2, 2), the period of monitoring span 120 (e.g., the time separation between the start of two spans) is 2 symbols, and each monitoring span 120 has a length of 2 symbols. For a PDCCH monitoring capability (2, 1), the period of monitoring span 130 is 2 symbols, and each monitoring span 130 has a length of 1 symbol. Similarly, monitoring span 140 has a period of 4 symbols, and each monitoring span has a length of 3 symbols; monitoring span 150 has a period of 7 symbols, and each monitoring span has a length of 3 symbols; monitoring span 160 has a period of 3 symbols, and each monitoring span has a length of 3 symbols.

In one implementation, the PDCCH monitoring capability or the length of a sub-slot may be dynamically changeable according to different requirements. For example, for one requirement whether each sub-slot is activated or not may depend on the existence of URLLC traffic. When there is a need for scheduling URLLC data, a sub-slot may be activated; otherwise, the sub-slot may be deactivated to reduce power consumption. In one implementation, deactivation of a sub-slot may not be restricted in one slot. In one implementation, a set of sub-slots that are present in multiple slots may be deactivated (e.g., a specific sub-slot may remain deactivated for multiple slots). As a result, a slot may be configured with eMBB PDCCH monitoring capability when the PDCCH monitoring spans for URLLC are deactivated, and the slot may be configured with URLLC PDCCH monitoring capability when the PDCCH monitoring spans for URLLC are activated.

Figure 2A:
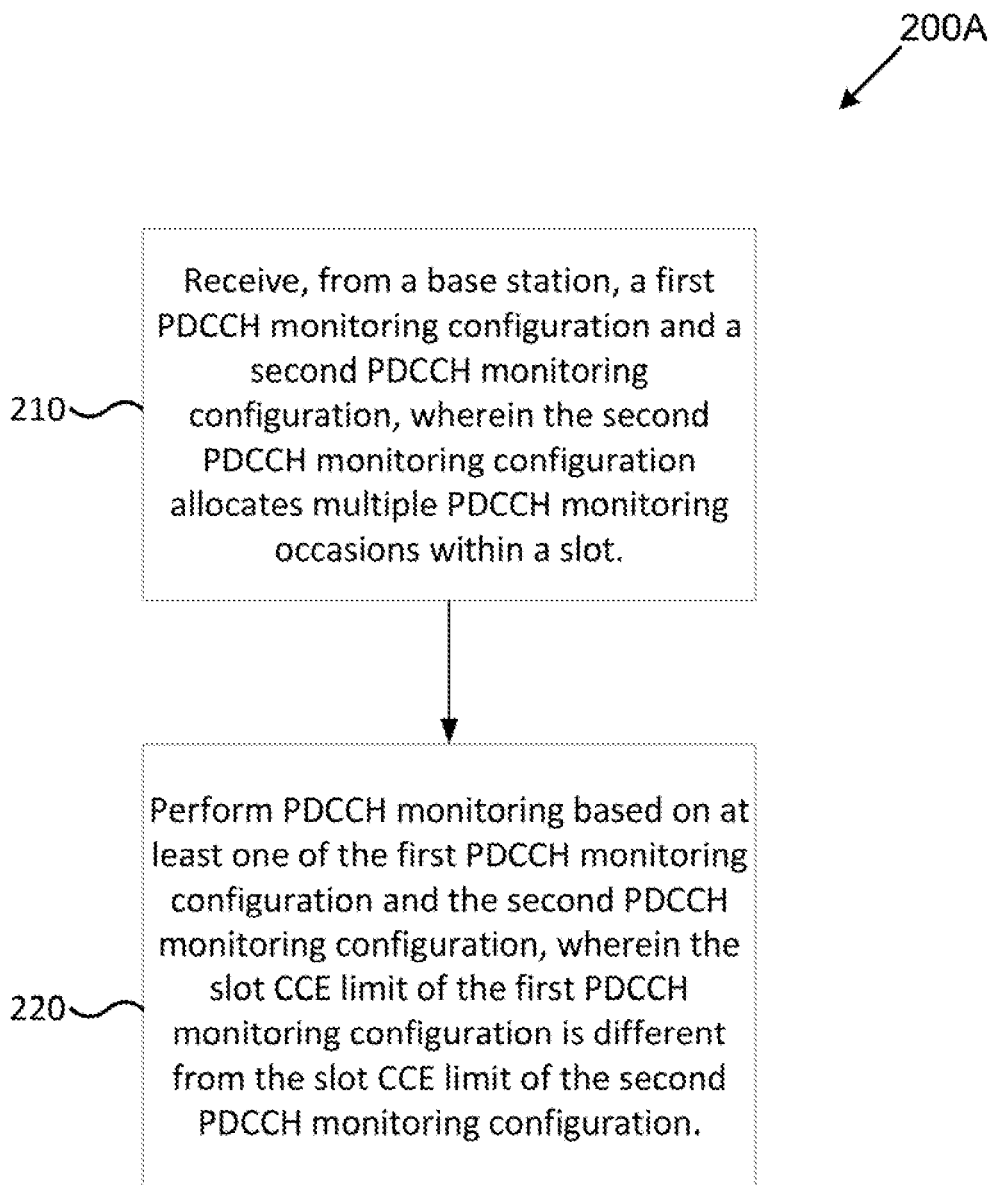
FIG. 2A is a flowchart of an example method for PDCCH monitoring performed by a UE, according to an example implementation of the present application.

FIG. 2A is a flowchart of an example method 200A for PDCCH monitoring performed by a UE, according to an example implementation of the present application. In action 210, the UE may receive, from a base station (e.g., a gNB), a first PDCCH monitoring configuration and a second PDCCH monitoring configuration, wherein the second PDCCH monitoring configuration may allocate multiple PDCCH monitoring occasions within a slot. In one implementation, a service corresponding to the second PDCCH monitoring configuration may have a higher priority than a service corresponding to the first PDCCH monitoring configuration. For example, the first PDCCH monitoring configuration may be used for the eMBB service, and the second PDCCH monitoring configuration may be used for the URLLC service. In one implementation, each PDCCH monitoring occasion allocated by the second PDCCH monitoring configuration may be fully contained in a PDCCH monitoring span.

In action 220, the UE may perform PDCCH monitoring based on the first PDCCH monitoring configuration and the second PDCCH monitoring configuration, wherein the slot CCE limit of the first PDCCH monitoring configuration may be different from the slot CCE limit of the second PDCCH monitoring configuration. The slot CCE limit may indicate the maximum number of non-overlapped CCEs in one slot. In one implementation, the first PDCCH monitoring configuration that has a slot-based CCE limit (or BD limit) and the second PDCCH monitoring configuration that has a non-slot based CCE limit (or BD limit) may be simultaneously scheduled. In one implementation, the UE may perform PDCCH monitoring based on the first PDCCH monitoring configuration in a time period (e.g., a set of slots), and perform PDCCH monitoring based on the second PDCCH monitoring in another time period (e.g., another set of slots). In one implementation, the slot CCE limit of the first PDCCH monitoring configuration (e.g., for eMBB service) may be set according to Table 1 (e.g., slot-based CCE limit). For example, the slot CCE limit of the first PDCCH monitoring configuration may be 56 when $\mu$ is 0. On the other hand, for the second PDCCH monitoring configuration (e.g., for URLLC service), the maximum number CCEs may be configured per half slot (e.g., non-slot based CCE limit) according to Table 1. For example, the slot CCE limit of the second PDCCH configuration may be 56×2=112 when $\mu$ is 0. It should be noted that the half-slot granularity used in the URLLC service is exemplary rather than limiting. Other sub-slot granularity may be used (e.g., one slot includes seven sub-slots) in different implementations.

In one implementation, the maximum number of non-overlapped BDs in one slot may be bound by a slot BD limit. In one implementation, the slot BD limit of the first PDCCH monitoring configuration may be different from the slot BD limit of the second PDCCH monitoring configuration. For example, based on Table 1, the slot BD limit of the first PDCCH monitoring configuration may be 44 when $\mu$ is 0, while the slot BD limit of the second PDCCH monitoring configuration may be 44×2=88 when $\mu$ is 0.

In one implementation, before action 210, the UE may transmit the service type it supports (e.g., a PDCCH monitoring capability) through uplink transmission to the base station. In one implementation, the PDCCH monitoring capability may include a sequence of duplets (X, Y) indicating a combination of PDCCH monitoring spans that the UE supports. The base station may transmit, to the UE, a PDCCH monitoring configuration based on the PDCCH monitoring capability of the UE. The PDCCH monitoring configuration may allocate PDCCH monitoring occasions that are in the PDCCH monitoring spans indicated by the UE. For example, the PDCCH monitoring capability transmitted by the UE may include a sequence {(2, 2), (4, 3), (7, 3)}. For example, after the base station knows that the UE is capable of monitoring PDCCH every two symbols and knows the CCE/BD limits per PDCCH monitoring span, the base station may transmit a PDCCH monitoring configuration that allocates PDCCH monitoring occasions every two symbols. In one implementation, the first PDCCH monitoring configuration and the second PDCCH monitoring configuration, in action 210, may be configured based on the PDCCH monitoring capability transmitted to the base station.

In one implementation, one slot may include multiple PDCCH monitoring spans. Each PDCCH monitoring occasion allocated by the second PDCCH monitoring configuration may be fully contained in one of the PDCCH monitoring spans. In one implementation, the maximum number of non-overlapped CCEs in one PDCCH monitoring span may be bound by a span CCE limit corresponding to the second PDCCH monitoring configuration. Different PDCCH monitoring configurations may have different values of the span CCE limit. For example, for the (2, 2) monitoring span configuration, one slot may include seven PDCCH monitoring spans, and each PDCCH monitoring occasion allocated by the second PDCCH monitoring configuration may be fully contained in one of these seven PDCCH monitoring spans. The span CCE limit for the (2, 2) monitoring span configuration may be 16 when $\mu$ is 0, 1, 2, 3. For the (7, 3) monitoring span configuration, one slot may include two PDCCH monitoring spans, and the span CCE limit for the (7, 3) monitoring span configuration may be 56 when μ is 0 and may be 32 when μ is 3. It should be noted that the numbers for the span CCE limit listed here are merely exemplary rather than limiting. In one implementation, the maximum number of BDs in one PDCCH monitoring span may be bound by a span BD limit corresponding to the second PDCCH monitoring configuration.

In one implementation, one slot may include multiple PDCCH monitoring spans, which may include a first PDCCH monitoring span and a second PDCCH monitoring span. In one implementation, the span CCE limit of the first PDCCH monitoring span may be different from the span CCE limit of the second PDCCH monitoring span. For example, for the (7, 3) monitoring span configuration, one slot may include the first PDCCH monitoring span and the second PDCCH monitoring span. The span CCE limit of the first PDCCH monitoring span may be 56, and the span CCE limit of the second PDCCH monitoring span may be 48. In one implementation, the span BD limit of the first PDCCH monitoring span may be different from the span BD limit of the second PDCCH monitoring span.

Figure 2B:
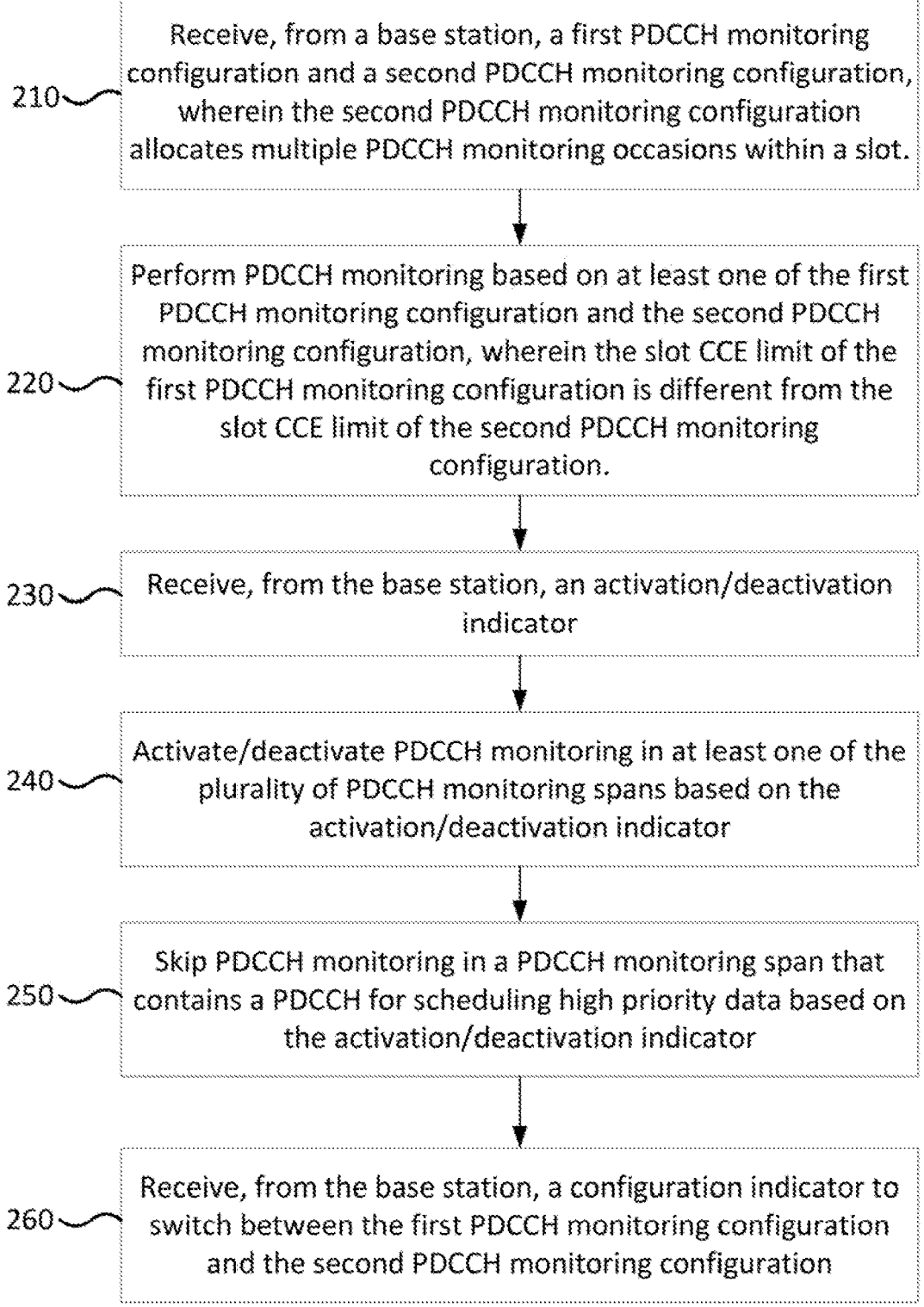
FIG. 2B is a flowchart of another example method for PDCCH monitoring performed by a UE, according to an example implementation of the present application.

FIG. 2B is a flowchart of another example method 200B for PDCCH monitoring performed by a UE, according to an example implementation of the present application. It should be noted that although actions 210, 220, 230, 240, 250 and 260 are delineated as separate actions represented as independent blocks in FIG. 2B, these separately delineated actions should not be construed as necessarily order dependent. The order in which the actions are performed in FIG. 2B is not intended to be construed as a limitation, and any number of the described blocks may be combined in any order to implement the method, or an alternate method. Moreover, one or more of the actions 210, 220, 230, 240, 250 and 260 may be omitted in some of the present implementations. In FIG. 2B, actions 210 and 220 are substantially similar to respective actions 210 and 220 in FIG. 2A, the details of which are omitted for brevity. In action 230, the UE may receive, from the base station, an activation/deactivation indicator. In action 240, the UE may activate/deactivate PDCCH monitoring in at least one of the PDCCH monitoring spans based on the activation/deactivation indicator. In action 250, the UE may skip PDCCH monitoring in a PDCCH monitoring span that contains a PDCCH for scheduling high priority data based on the activation/deactivation indicator. In action 260, the UE may receive, from the base station, a configuration indicator to switch between the first PDCCH monitoring configuration and the second PDCCH monitoring configuration. Detailed description with respect to the actions shown in FIG. 2B are provided below.

In one implementation, the search space monitoring periodicity may be determined by a configuration. When the UE capability indicates that a URLLC feature is supported, a search space ID may be specifically used to schedule the URLLC data in a non-slot based period, and the UE may need to monitor the PDCCH candidates frequently. Although the URLLC data burst may not occur very often, the UE may still need to keep monitoring the PDCCH candidates according to the configured periodicity unless a new PDCCH monitoring occasion is reconfigured. In one implementation, in order to avoid wasting too much power on monitoring unnecessary PDCCH candidates, a slot may be divided into multiple sub-slots (or a slot may include multiple PDCCH monitoring spans) by considering the distribution of PDCCH monitoring occasions upon the URLLC transmission or reception.

In one implementation, one or multiple sub-slots may constitute a sub-slot group. Different sub-slot groups may be used to schedule different PDCCH monitoring configurations. Moreover, a base station may configure the granularity of a sub-slot and schedule the corresponding configuration to the UE. In one implementation, a sub-slot configuration may be as described in Table 2 below, where the description of each field in the sub-slot configuration may be as described in Table 3 below. Abstract Syntax Notation One (ASN.1) may be used to describe the data structure of various implementations of an information element (IE) in the present application.

TABLE 2

Sub-Slot-Config ::= SEQUENCE {
  nrofSubSlotsWithinSlot ENUMERATED {},
  nrofSubSlotsWithinSubSlotGroup ENUMERATED {},
  SubSlotId INTEGER (),
  SubSlotGroupId INTEGER (),
  duration INTEGER (),
  K INTEGER (),
  subslotDeactivationTimer ENUMERATED {}
  ...
}

TABLE 3

| Parameter | Description |
|---|---|
| nrofSubSlotsWithinSlot | The number of sub-slots configured within a slot. |
| nrofSubSlotsWithinSubSlotGroup | The number of sub-slots configured within a sub-slot group. |
| SubSlotId | Identity of a sub-slot. In one implementation, SubSlotId of the primary sub-slot is 0. |
| SubSlotGroupId | Identity of a sub-slot group. In one implementation, SubSlotGroupId of the primary sub-slot group is 0. |
| Duration | The number of consecutive slots/sub-slots that an activation/deactivation indicator lasts. |
| K | The value indicates that the activation/deactivation indicator may apply to the $(K + 1)^{th}$ slot/sub-slot (the current slot/sub-slot counts as the first slot/sub-slot). |
| subslotDeactivationTimer | Sub-slot deactivation timer. The sub-slot is deactivated upon expiration of the sub-slot deactivation timer. |

The sub-slot configuration IE (e.g., Sub-Slot-Config) may indicate a UE specific sub-slot configuration for one DL BWP. In one implementation, the sub-slot configuration IE may be carried in a BWP Downlink Dedicated IE (e.g., BWP-DownlinkDedicated), which may carry a PDCCH configuration (e.g., pdcch-Config) as well. In one implementation, some of the parameters in Table 2 and Table 3 may be optionally configured.

In one implementation, after a UE receives the sub-slot configuration, each sub-slot may be activated or deactivated by dynamic signalling or Medium Access Control (MAC) Control Element (CE) when the UE receives an indication of URLLC from a base station. When the UE does not receive such an indication, the sub-slot may remain deactivated to reduce power consumption. In one implementation, activation of a sub-slot means that the UE may monitor the PDCCH candidates in the activated sub-slot. Conversely, deactivation of a sub-slot means that the UE may skip monitoring the PDCCH candidates in the deactivated sub-slot. In one implementation, the initial state for a sub-slot may be deactivated.

In one implementation, there may be different limitations on BDs or CCEs for URLLC UEs and eMBB UEs. As such, there may be an indication for distinguishing different configurations. Different PDCCH monitoring configurations may indicate different limitations on BDs or CCEs per slot. For a UE with different service types associated with different PDCCH monitoring configurations, a base station (e.g., a gNB) may need to transmit different PDCCH monitoring configurations to the UE and distribute appropriate PDCCH monitoring occasions within a slot. Because the base station may not know the preferred data traffic transmission of the UE before receiving information from the UE, the base station may not indicate (to the UE) which PDCCH monitoring configuration may be suitable for the UE. In one implementation, the UE may transmit at least one of a buffer status report (BSR), a scheduling request (SR), and a PDCCH monitoring capability (e.g., {(2, 2), (4, 3), (7, 3)}) to the base station. According to at least one of the BSR, SR, and PDCCH monitoring capability received from the UE, the base station may allocate a proper data traffic transmission to a specific logical channel (LCH) group (which may be referred to as a special SR configuration).

In one implementation, when the base station allocates data to a higher priority LCH, the base station may adjust the PDCCH monitoring configuration accordingly and inform the UE. For instance, there may be two different PDCCH monitoring configurations, each having different BDs/CCEs limits. One PDCCH monitoring configuration (e.g., for scheduling eMBB data) may have slot BD limits of 44/36/22/20 for subcarrier spacing 15 kHZ/30 kHZ/60 kHZ/120 kHZ, and slot CCEs limits of 56/56/48/32 for subcarrier spacing 15 kHZ/30 kHZ/60 kHZ/120 kHZ. Another PDCCH monitoring configuration (e.g., for scheduling URLLC data) may have different BDs/CCEs limits. In one implementation, the PDCCH monitoring configuration for scheduling URLLC data may have a larger value of BDs/CCEs limits to accommodate more frequent PDCCH monitoring within a slot. In one implementation, eMBB data may belong to a logical channel having a lower priority, and URLLC data may belong to a logical channel having a higher priority.

In one implementation, when there are multiple PDCCH monitoring configurations, the base station may give each PDCCH monitoring configuration an index, and use the index to support fast switching between different configurations for each slot. In one implementation, the UE may receive, from the base station, a configuration indicator to switch between the first PDCCH monitoring configuration and the second PDCCH monitoring configuration (e.g., as described with reference to action 260 in FIG. 2B). For instance, a PDCCH monitoring configuration ID may be appended to the dynamic signalling. The PDCCH monitoring configuration ID may be assigned to the UE to combine with the sub-slot mechanism. In one implementation, when services are scheduled in a slot, the UE may use the corresponding PDCCH monitoring configuration subject to the signalled ID, and the UE may determine whether to turn on the sub-slot configuration. For example, the PDCCH monitoring configuration subject to the signalled ID may refer to a search space ID or a CORESET ID that is associated with the PDCCH monitoring configuration. An efficient power saving may be achieved by combing an explicit configuration ID and the sub-slot mechanism.

Figure 3:
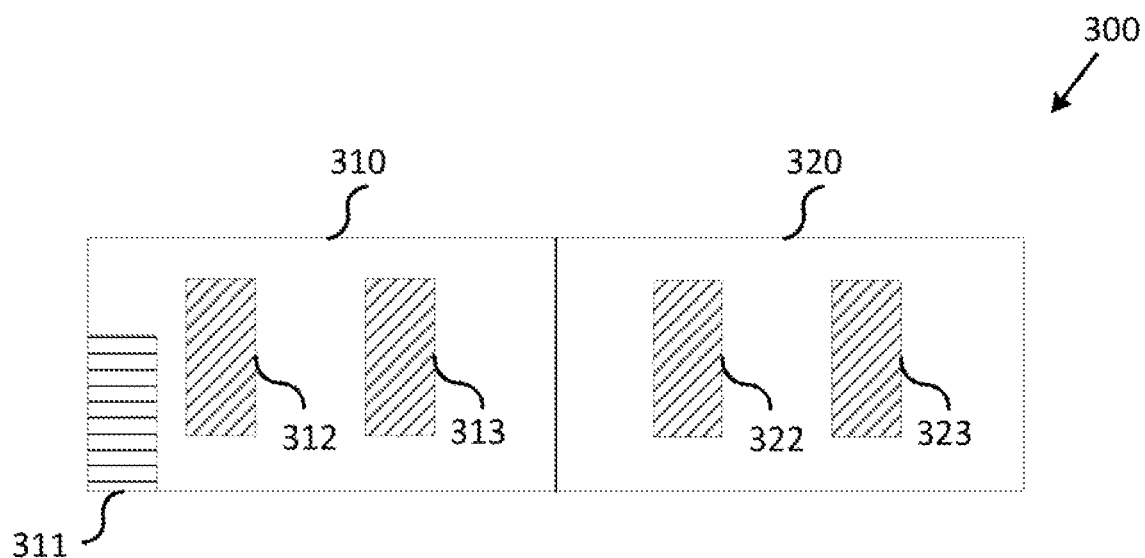
FIG. 3 includes a diagram illustrating PDCCH monitoring occasions in two sub-slots within a slot, according to an example implementation of the present application.

In one implementation, PDCCH monitoring may usually occur in the first three OFDM symbols in a slot for an eMBB UE, and hence most PDCCH candidates may be distributed in the first half of the slot. As such, deactivation of the second half of the slot may not affect the PDCCH monitoring for the eMBB UE. FIG. 3 includes a diagram illustrating PDCCH monitoring occasions in two sub-slots within a slot, according to an example implementation of the present application. Slot 300 is divided into sub-slot 310 and sub-slot 320. Sub-slot 310 (e.g., the first half of slot 300) may be referred to as sub-slot #0 or a primary sub-slot. Sub-slot 320 may be referred to as sub-slot #1 or a secondary sub-slot. PDCCH 311 may be used for scheduling eMBB data, and PDCCHs 312, 313, 322, 323 may be used for scheduling URLLC data. In this example, slot 300 includes two PDCCH monitoring spans. PDCCHs 311, 312, 313 are contained in the first PDCCH monitoring span. PDCCHs 322 and 323 are contained in the second PDCCH monitoring span.

In one implementation, the UE may receive, from the base station, an activation/deactivation indicator (e.g., as described with reference to action 230 in FIG. 2B). The UE may activate/deactivate PDCCH monitoring in at least one of the PDCCH monitoring spans (or sub-slots) based on the activation/deactivation indicator (e.g., as described with reference to action 240 in FIG. 2B). For example, the activation/deactivation indicator may indicate whether to activate/deactivate the first PDCCH monitoring span (or sub-slot 310) and/or the second PDCCH monitoring span (or sub-slot 320).

In one implementation, sub-slot 310 (e.g., the primary sub-slot) may be activated and sub-slot 320 (e.g., the secondary sub-slot) may be deactivated. In this case, the UE may perform PDCCH monitoring in sub-slot 310 and skip PDCCH monitoring in sub-slot 320. In another implementation, sub-slot 310 and sub-slot 320 may both be deactivated. In this case, the UE may skip monitoring any PDCCH candidates allocated in slot 300. In still another implementation, all sub-slot containing URLLC-related PDCCHs may be deactivated. In this case, the UE may skip monitoring PDCCH for scheduling URLLC data in both sub-slot 310 and sub-slot 320. In one implementation, sub-slot 320 (e.g., the secondary sub-slot) may be deactivated by default, and sub-slot 320 may be deactivated until receiving an activation/deactivation indicator that activates sub-slot 320.

In one implementation, the activation/deactivation indicator may be carried in a MAC CE or a Downlink Control Information (DCI) format.

Case 1: Activation/Deactivation Indication Through a MAC CE

Figure 4:
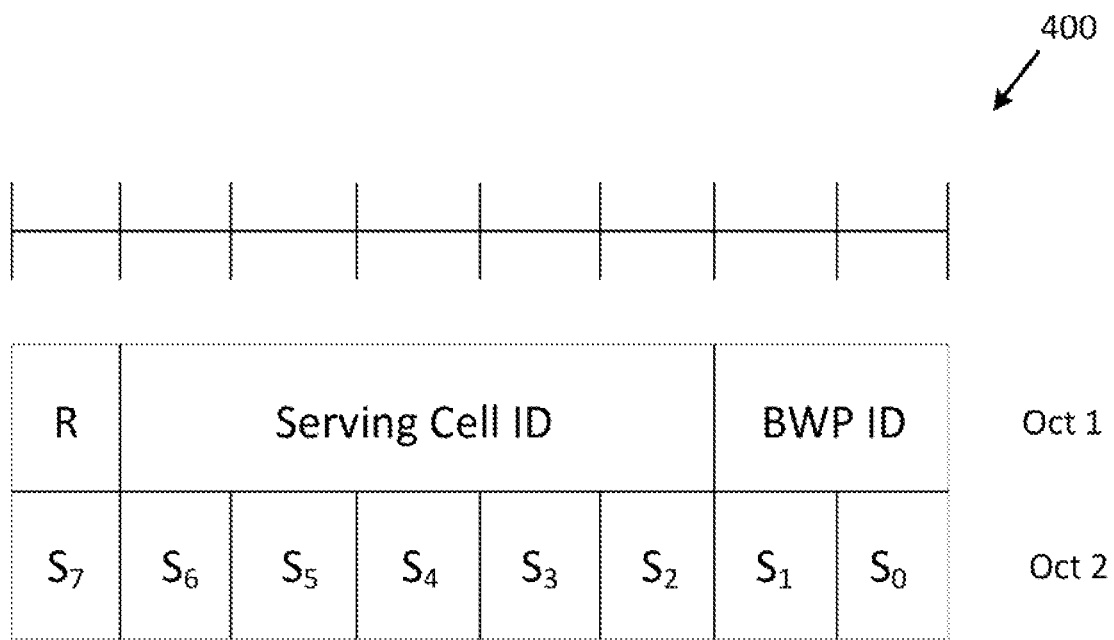
FIG. 4 includes a diagram illustrating an example activation/deactivation Medium Access Control (MAC) Control Element (CE), according to an example implementation of the present application.

Activating/deactivating a PDCCH monitoring span (or sub-slot) may be achieved using an activation/deactivation indicator that is carried by a MAC CE. FIG. 4 includes a diagram illustrating an example activation/deactivation MAC CE, according to an example implementation of the present application. MAC CE 400 may include two octets, each having 8 bits. The first octet may include a reserved bit R (which may be set to '0' by default), 5 bits for a serving cell ID (e.g., the identity of the serving cell for which MAC CE 400 applies), and 2 bits for a BWP ID (e.g., the identity of a DL BWP for which MAC CE 400 applies). The second octet may include 8 bits $S_7$-$S_0$, each representing a PDCCH monitoring span (or a sub-slot) to be activated or deactivated.

In one implementation, if there is a sub-slot ID (e.g., SubSlotId) or a sub-slot group ID (e.g., SubSlotGroupId) specified in a sub-slot configuration, the field $S_i$ (where i is an integer ranging from 0 to 7) may indicate an activation/deactivation status of a sub-slot with sub-slot ID i or a sub-slot group with sub-slot group ID i. A MAC entity of the UE may ignore the field $S_i$ if there is no sub-slot ID or sub-slot group ID. In one implementation, the field $S_i$ may be set to '1' to indicate that the sub-slot/sub-slot group with SubSlotId/SubSlotGroupID i is activated. The field $S_i$ may be set to '0' to indicate that the sub-slot/sub-slot group with SubSlotId/SubSlotGroupID i is deactivated.

In one implementation, a deactivation timer (e.g., subslotDeactivationTimer) may be configured, and a PDCCH monitoring span (or a sub-slot) may be deactivated when the deactivation timer expires. Such an implicit way to deactivate a PDCCH monitoring span may be beneficial to save power when PDCCH for scheduling URLLC data does not need to be monitored or is configured during a specified time period.

A configured sub-slot may be activated and deactivated by:
  receiving the sub-slot activation/deactivation MAC CE; and/or
  configuring subslotDeactivationTimer per configured BWP or per serving cell.

In one implementation, a method performed by a MAC entity of a UE may be as described in the following Table 4:

TABLE 4

The MAC entity may:
1> if a sub-slot activation/deactivation MAC CE for activating the sub-slot is received
   2> activate the sub-slot; apply normal sub-slot operation including:
      3> PDCCH monitoring in the sub-slot;
   2> start or restart the subslotDeactivationTimer associated with the BWP or the cell
1> else if a sub-slot activation/deactivation MAC CE for deactivating the sub-slot is received;
or
1> if the subslotDeactivationTimer associated with the BWP or the cell expires:
   2> deactivate the sub-slot;
   2> stop the subslotDeactivationTimer associated with the BWP or the cell;
1> if PDCCH is monitored in the secondary sub-slot:
   2> restart the subslotDeactivationTimer associated with the BWP or the cell;
1> if the sub-slot is deactivated:
   2> skip monitoring the PDCCH in the sub-slot.

Case 2: Activation/Deactivation Indication Through a DCI Format

Figure 5:
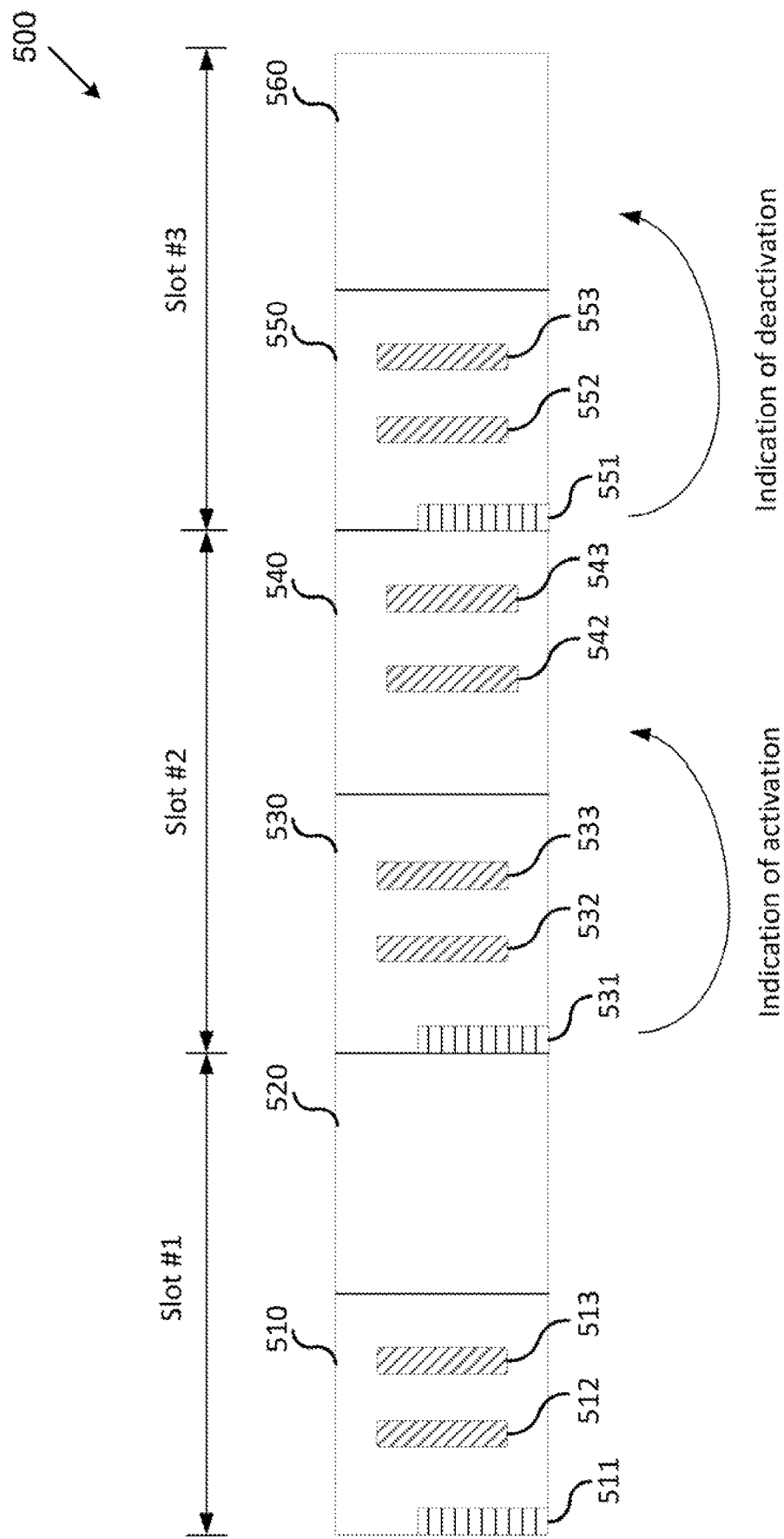
FIG. 5 includes a diagram illustrating an example dynamic indication of activation/deactivation, according to an example implementation of the present application.

In one implementation, a UE may receive an explicit indicator in DCI on the primary sub-slot to dynamically activate/deactivate the secondary sub-slot. FIG. 5 includes a diagram 500 illustrating an example dynamic indication of activation/deactivation, according to an example implementation of the present application. As shown in FIG. 5, slot #1 is divided into sub-slot 510 and sub-slot 520, slot #2 is divided into sub-slot 530 and sub-slot 540, and slot #3 is divided into sub-slot 550 and sub-slot 560. Sub-slots 510, 530, 550 may be referred to as sub-slot #0 or the primary sub-slot, and sub-slots 520, 540, 560 may be referred to as sub-slot #1 or the secondary sub-slot. PDCCHs 511, 531, 551 may be used for scheduling eMBB data, and PDCCHs 512, 513, 532, 533, 542, 543, 552, 553 may be used for scheduling URLLC data. In this example, each slot includes two PDCCH monitoring spans Taking slot #2 for example, PDCCHs 531, 532, 533 are contained in the first PDCCH monitoring span, and PDCCHs 542 and 543 are contained in the second PDCCH monitoring span.

In one implementation, the secondary sub-slot may be deactivated by default. For example, sub-slot 520 (sub-slot #1 of slot #1) is deactivated. The UE may receive a DCI that triggers the activation of a sub-slot in slot #2. As such, sub-slot 540 (the secondary sub-slot in slot #2) may be activated accordingly. In one implementation, considering a DCI decoding time of a UE capability, the DCI signalling (for activation/deactivation indication) may be allocated in the front of the primary sub-slot, which may be no later than $x^{th}$ OFDM symbol, where $0 \leq x \leq 7$ and the index of the starting symbol is 0. In sub-slot 550 (sub-slot #0 of slot #3), the UE may receive a DCI that triggers deactivation of the secondary sub-slot, and sub-slot 560 may be deactivated accordingly. In this case, the UE may skip PDCCH monitoring in a PDCCH monitoring span that contains a PDCCH for scheduling high priority data (e.g., URLLC data) (as described with reference to action 250 in FIG. 2B).

In one implementation, if multiple sub-slots are configured (e.g., one slot including a primary sub-slot and two or more secondary sub-slots), the DCI may be received in a primary sub-slot to trigger an activation/deactivation of all secondary sub-slots. In one implementation, a sub-slot ID may be appended to the DCI. In one implementation, the DCI may be received in any sub-slot (including the primary sub-slot or the secondary sub-slot) to trigger an activation/deactivation of other sub-slots when the UE is required to monitor this sub-slot (e.g., based on the configured PDCCH monitoring configuration or MAC CE). Several implementations of dynamic indication are provided below.

Case 2-1: An Indicator for Activation/Deactivation May be Included in a DCI with Cyclic Redundancy Check (CRC) Scrambled by a Cell Radio Network Temporary Identifier (C-RNTI) or Configured Scheduling RNTI (CS-RNTI) or Modulation Coding Scheme C-RNTI (MCS-C-RNTI) or any UE-Specific RNTI.

In one implementation, one bit may be used to schedule the activation/deactivation of a specific sub-slot ID. In one implementation, the bit may be set to '0' to indicate deactivation and '1' to indicate activation of a secondary sub-slot. In one implementation, x bits (where x is an integer greater than 1) may be used to indicate a sub-slot ID that is activated/deactivated.

In one implementation, y bits (where y is an integer greater than 1) in the DCI or the parameter duration in the Sub-Slot-Config IE where the DCI is found may be used to explicitly indicate the number of consecutive slots/sub-slots that an activation or deactivation may last. For example, if duration=3, a specific sub-slot may remain activated for the next three consecutive slots (or sub-slots) and then may be deactivated accordingly.

In one implementation, the parameter duration may imply the number of consecutive PDCCH monitoring occasions that the indicator lasts. For example, if duration=3, a specific sub-slot (wherein search space sets with the configured monitoring periodicity) may remain activated for the next three consecutive monitoring occasions and then may be deactivated accordingly.

In one implementation, z bits (where z is an integer greater than 1) in the DCI may be used to indicate a bitmap for the activation/deactivation status for respective sub-slots. For instance, z=3 when three sub-slots are configured. When the z bits in the DCI is 010 (corresponding to a decimal value 2), sub-slot #2 and sub-slot #0 may be deactivated and sub-slot #1 may be activated.

Case 2-2: A Compact DCI May Implicitly Indicate Activation/Deactivation Status of Sub-Slots within a Slot.

In one implementation, a compact DCI having a smaller DCI payload size may be used to schedule URLLC data to achieve high reliability requirement. In this case, when the UE detects a compact DCI in a primary sub-slot due to the need of scheduling URLLC data, the UE may activate the secondary sub-slot. On the other hand, when the UE does not detect a compact DCI, the UE may deactivate the secondary sub-slot.

In one implementation, such implicit activation/deactivation may be supported in not only the primary sub-slot but also all other sub-slots. For example, when the UE detects the compact DCI in the present sub-slot, the UE may assume the next sub-slot (regardless of primary sub-slot or secondary sub-slot) as being required to monitor PDCCH for scheduling URLLC data. On the other hand, when the UE does not detect the compact DCI, the UE may assume the next sub-slot to be deactivated. In one implementation, when the UE does not detect other types of DCI (e.g., other than the compact DCI), the UE may assume there is no PDCCH for scheduling eMBB data in the next sub-slot, and the UE may deactivate the sub-slot where the PDCCH for scheduling eMBB data is monitored.

Case 2-3: PDCCH Repetition May Implicitly Indicate Activation/Deactivation Status of Sub-Slot within a Slot.

In one implementation, PDCCH repetition may be used to provide extra robustness for DCI to achieve high reliability requirement for URLLC. In this case, when PDCCH repetition is provided, URLLC data may have to be scheduled. In other words, when PDCCH repetition is provided, the UE may activate the secondary sub-slot. In one implementation, such implicit activation/deactivation may be supported in not only the primary sub-slot but also all other sub-slots. For example, when the UE detects the PDCCH repetition in the present sub-slot, the UE may assume the next sub-slot (regardless of primary sub-slot or secondary sub-slot) as being required to monitor PDCCH for scheduling URLLC data. On the other hand, when the UE does not detect the PDCCH repetition, the UE may assume the next sub-slot to be deactivated. In one implementation, when the UE only detects PDCCH repetition in this slot, the UE may assume there is no PDCCH for scheduling eMBB data in the next sub-slot, and the UE may deactivate the sub-slot where the PDCCH for scheduling eMBB data is monitored.

Several implementations regarding two sub-slots (e.g., a primary sub-slot and a secondary sub-slot) in a slot have been provided. In another implementation, a length of a sub-slot may depend on the PDCCH monitoring occasions. The PDCCH monitoring occasions may be configured according to the PDCCH monitoring spans, which may be provided by the UE as the UE's PDCCH monitoring capability.

In one implementation, for subcarrier spacing 15 kHZ, PDCCH monitoring on any span of up to three consecutive OFDM symbols in a slot may be supported, and PDCCH for scheduling eMBB data may not be distributed in the first three symbols of the slot. In this case, the primary sub-slot may not be the first sub-slot if the PDCCH for scheduling eMBB data is included in the primary sub-slot. Therefore, rather than partitioning a slot into two parts, the granularity of a sub-slot within one slot may fit different monitoring occasions.

In one implementation, eMBB data and URLLC data may be scheduled within the same slot. In one implementation, PDCCH in a Control Resource Set (CORESET) with three consecutive OFDM symbols for scheduling eMBB data may start in the middle of a slot, and PDCCH monitoring periodicity for scheduling URLLC data may be two symbols. Two implementations on the granularity of a sub-slot according to the PDCCH monitoring occasions are provided below with reference to FIGS. 6 and 7.

Figure 6:
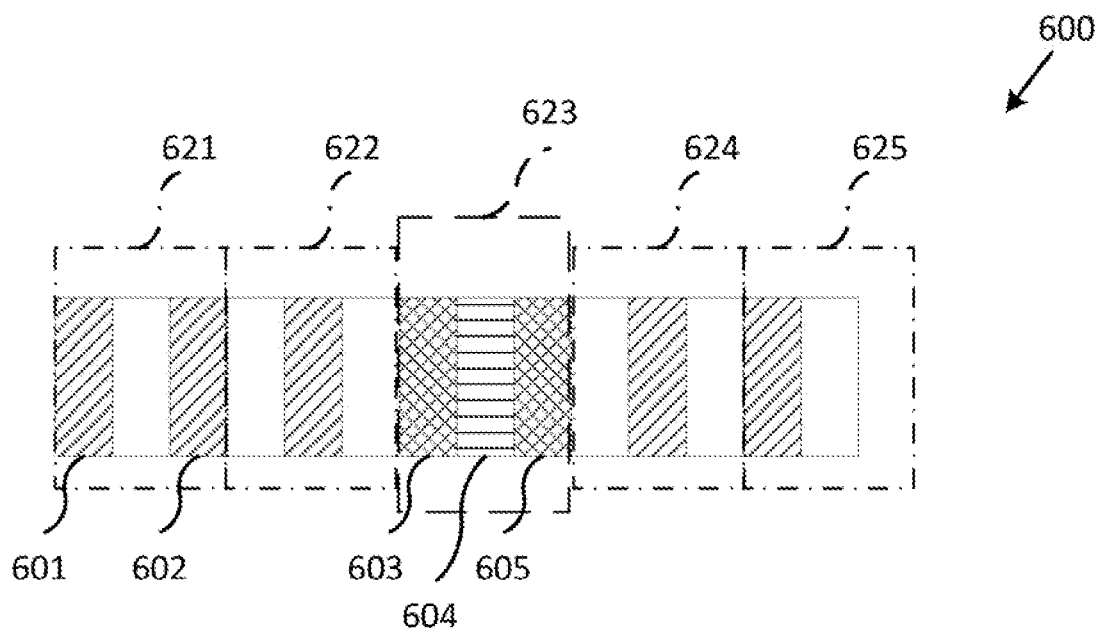
FIG. 6 includes a diagram illustrating an example sub-slot granularity according to PDCCH monitoring occasions, according to an example implementation of the present application.

FIG. 6 includes a diagram 600 illustrating an example sub-slot granularity according to PDCCH monitoring occasions, according to an example implementation of the present application. In this example, one slot includes fourteen symbols. The period for scheduling URLLC data may be two symbols. For example, PDCCH 601, PDCCH 602, and other PDCCH monitoring occasions illustrated with similar shades in FIG. 6 may be used for scheduling URLLC data. PDCCH for scheduling eMBB data may occupy three consecutive symbols. For example, PDCCHs 603, 604, and 605 may be used for scheduling eMBB data, while PDCCHs 603 and 605 may be overlapped PDCCHs for also scheduling URLLC data.

In one implementation, the granularity of a sub-slot may depend on the position of PDCCH for scheduling eMBB data in a slot (e.g., PDCCHs 603-605). For example, one sub-slot (or PDCCH monitoring span) may include three symbols. As shown in FIG. 6, a slot may be divided into five sub-slots 621-625. In one implementation, one or multiple sub-slots may constitute a sub-slot group to reduce the number of sub-slot IDs. In one implementation, the PDCCHs that schedule the same service type may be put into the same sub-slot group. Each sub-slot group may be identified as an individual service type. For example, sub-slot 623 may belong to sub-slot group #0 (for eMBB), and sub-slots 621, 622, 624, 625 may belong to sub-slot group #1 (for URLLC). The sub-slot group #0 may be referred to as the primary sub-slot group. In one implementation, each sub-slot group may be activated/deactivated through a MAC CE or a DCI format, which has been mentioned in the previous implementations.

Figure 7:
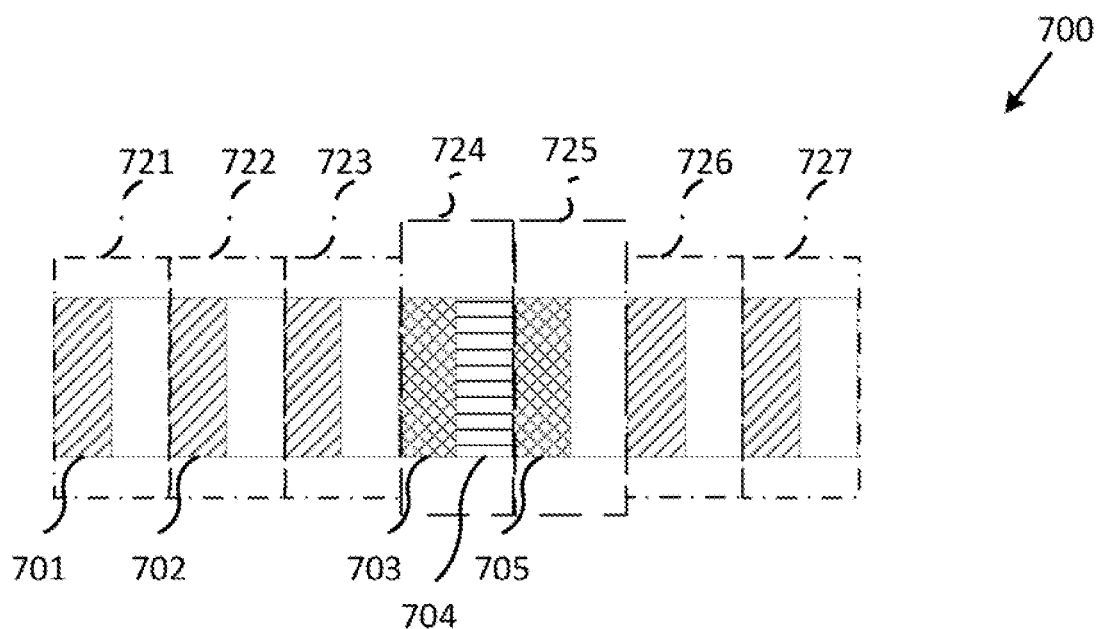
FIG. 7 includes a diagram illustrating another example sub-slot granularity according to PDCCH monitoring occasions, according to an example implementation of the present application.

FIG. 7 includes a diagram 700 illustrating another example sub-slot granularity according to PDCCH monitoring occasions, according to an example implementation of the present application. In this example, one slot includes fourteen symbols. The period for scheduling URLLC data may be two symbols. For example, PDCCH 701, PDCCH 702, and other PDCCH monitoring occasions illustrated with similar shades in FIG. 7 may be used for scheduling URLLC data. PDCCH for scheduling eMBB data may occupy three consecutive symbols. For example, PDCCHs 703, 704, and 705 may be used for scheduling eMBB data, while PDCCHs 703 and 705 may be overlapped PDCCHs for also scheduling URLLC data.

In one implementation, the granularity of a sub-slot may depend on the PDCCH monitoring occasions for scheduling URLLC data (e.g., PDCCH 701 and 702). For example, one sub-slot (or PDCCH monitoring span) may include two symbols. As shown in FIG. 7, a slot may be divided into seven sub-slots 721, 722, 723, 724, 725, 726, and 727. In one implementation, each sub-slot may have its own ID to support the indication of activation/deactivation. In one implementation, sub-slot 724 and sub-slot 725 may stay activated during the same time to be completely accurate and avoid missing PDCCH monitoring for scheduling eMBB data.

As shown in FIG. 6 and FIG. 7, PDCCH for scheduling different traffic associated with different CORESETs may overlap on at least one OFDM symbol. These PDCCHs may have the same Quasi Co Location type-D (QCL-typeD). If they do not have the same QCL-typeD, the common search space (CSS) set with higher ID or the UE-specific search space (USS) set with higher ID may be dropped, which means a low priority ID may be dropped. In one implementation, if the PDCCH for scheduling different traffic associated with different CORESETs overlap on at least one OFDM symbol with various QCL-typeD in individual Transmission Configuration Indication (TCI) states, these search space sets may be decodable simultaneously with capability of multiple spatial filters received. In one implementation, the PDCCH for scheduling URLLC data may be associated with the lowest search space set ID, which means it may have a higher priority than the PDCCH for scheduling eMBB data. In one implementation, the PDCCH for scheduling eMBB data may be associated with the lowest search space set ID, which means it may have a higher priority than the PDCCH for scheduling URLLC data. In addition, if two or more different CORESETs are within the same sub-slot/sub-slot group, activation/deactivation may depend on the PDCCH with a higher priority. For example, when the PDCCH for scheduling URLLC data has a higher priority, the sub-slot/sub-slot group where the PDCCH for scheduling URLLC data is located may be activated/deactivated.

Figure 8:
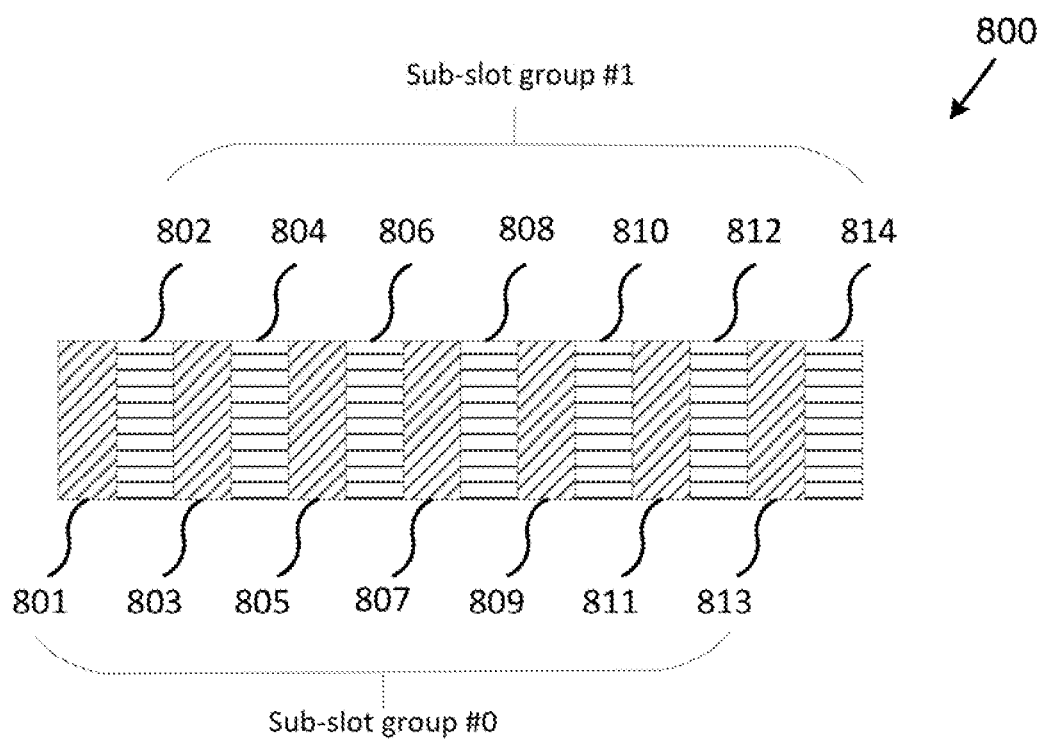
FIG. 8 includes a diagram illustrating an example slot in which different URLLC data are scheduled, according to an example implementation of the present application.

In one implementation, different URLLC data traffic may be scheduled within a slot. For example, different URLLC data with different monitoring configurations may be scheduled by utilizing activation of different sub-slots or sub-slot groups. FIG. 8 includes a diagram 800 illustrating an example slot in which different URLLC data are scheduled, according to an example implementation of the present application. In this example, one slot may include fourteen symbols, and one sub-slot may include one symbol. In one implementation, sub-slots with the same traffic may compose a sub-slot group. As shown in FIG. 8, sub-slots 801, 803, 805, 807, 809, 811, 813 may constitute sub-slot group #0, which may include PDCCH for scheduling the first URLLC data. Similarly, sub-slots 802, 804, 806, 808, 810, 812, 814 may constitute sub-slot group #1, which may include PDCCH for scheduling the second URLLC data.

Case 3: Cross Slot (or Sub-Slot) Scheduling Indication of Activation/Deactivation In one implementation, a base station may determine the granularity of a sub-slot based on different PDCCH monitoring configurations. The base station may select few sub-slots as the primary sub-slot group, and the remaining sub-slots as the secondary sub-slot group. In one implementation, the base station may assign each sub-slot (or each sub-slot group) a specific index to make scheduling easier.

Sometimes there is an urgent requirement of URLLC data that need to be scheduled immediately. However, a DCI with a dynamic indication in the activated sub-slot serving for URLLC data may not always span in the first three symbols of a slot, and hence the scheduling for URLLC data may be postponed to the next slot. In addition, a sub-slot with an indicator may need to be kept activated until a target activated sub-slot is achieved.

Case 3-1: K Value is in Unit of Slot.

Figure 9:
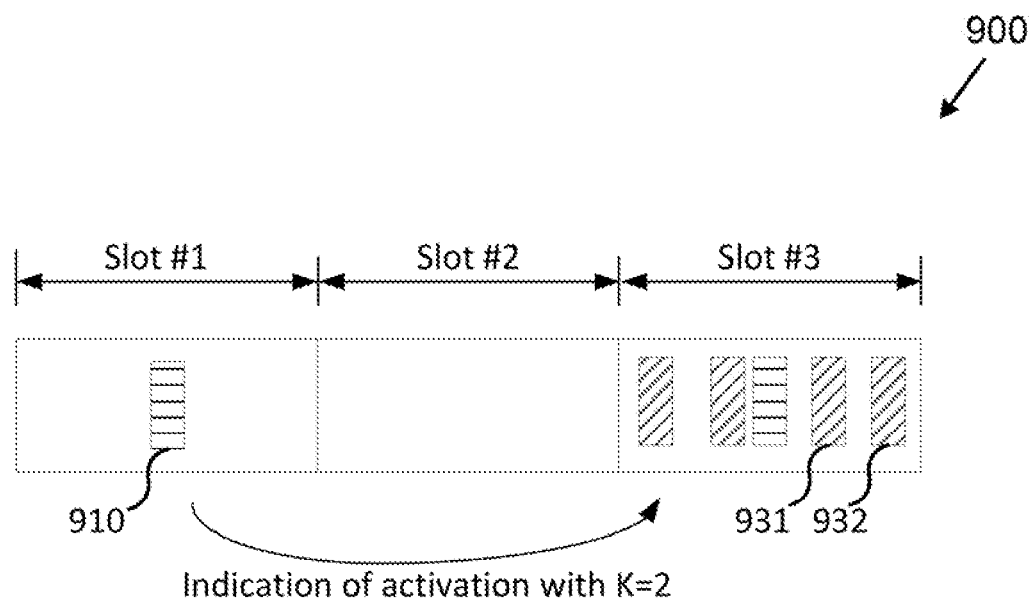
FIG. 9 includes a diagram illustrating an example cross slot scheduling indication, according to an example implementation of the present application.

K value may be preconfigured in a sub-slot configuration (e.g., Sub-Slot-Config IE shown in Table 2 and Table 3) or appended to a DCI field. FIG. 9 includes a diagram 900 illustrating an example cross slot scheduling indication, according to an example implementation of the present application. In slot #1, only the primary sub-slot (e.g., PDCCH 910) is activated and the secondary sub-slots are deactivated. The UE receives an activation indication in slot #1. K=2 and K value is in unit of slot in this example, and thus the second upcoming slot (e.g., slot #3) may be activated (e.g., including PDCCH 931 and PDCCH 932). In one implementation, there may be no activated sub-slot in slot #2.

Figure 10:
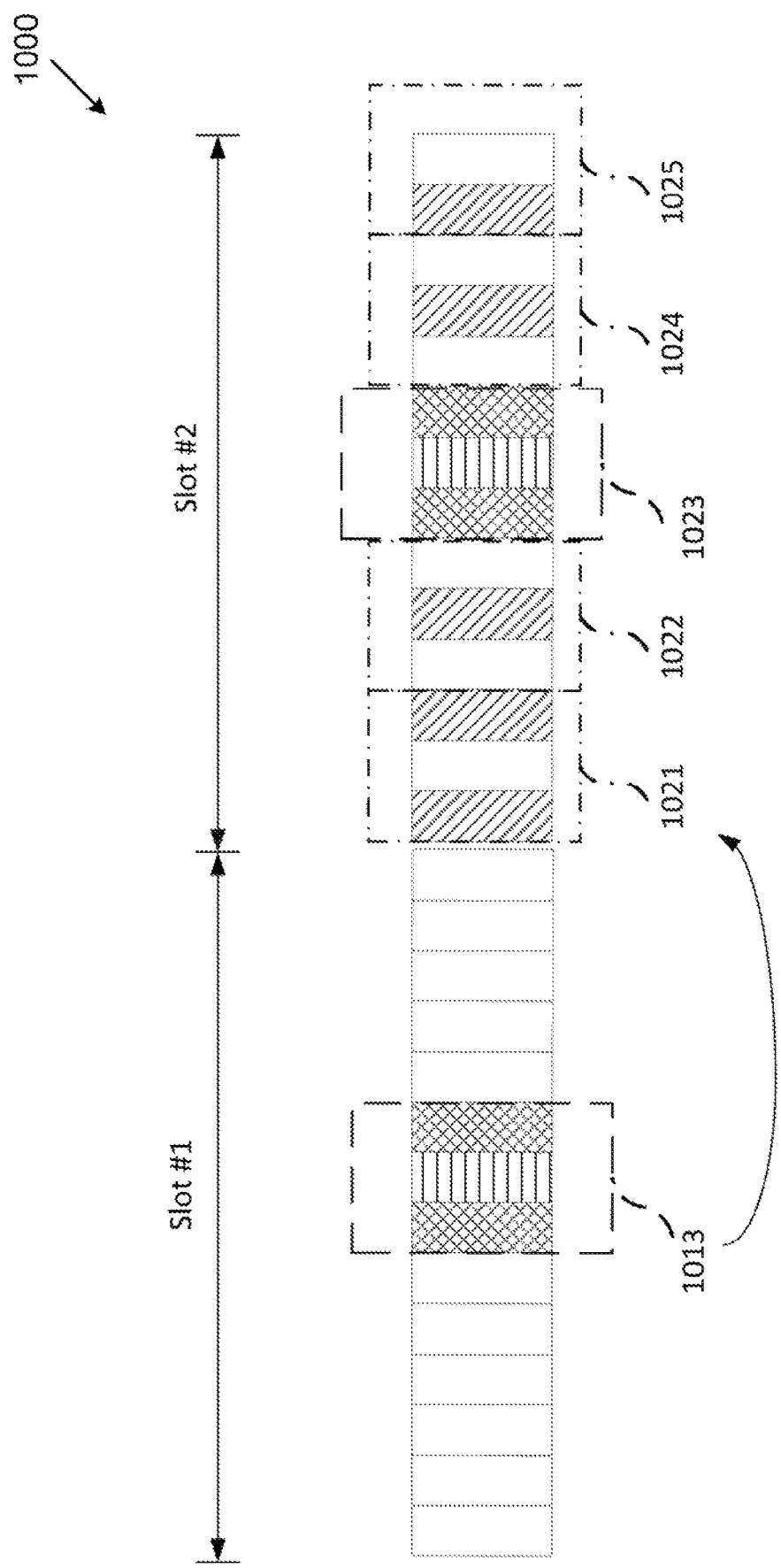
FIG. 10 includes a diagram illustrating another example cross slot scheduling indication, according to an example implementation of the present application.

FIG. 10 includes a diagram 1000 illustrating another example cross slot scheduling indication, according to an example implementation of the present application. The sub-slot granularity in FIG. 10 is similar to that in FIG. 6, and thus descriptions thereof are not repeated. In the example shown in FIG. 10, in slot #1, only the primary sub-slot 1013 is activated. The UE receives an activation indication in sub-slot 1013. K=1 and K value is in unit of slot in this example, and thus the first upcoming slot (e.g., including sub-slots 1021-1025) may be activated. In one implementation, the PDCCHs that schedule the same service type may be put into the same sub-slot group. For example, sub-slot 1023 may belong to sub-slot group #0 (e.g., primary sub-slot group), and sub-slots 1021, 1022, 1024, 1025 may belong to sub-slot group #1 (e.g., secondary sub-slot group). In slot #1, sub-slot group #0 is activated and sub-slot group #1 is deactivated. After receiving the activation indication, in slot #2, both of sub-slot group #0 and sub-slot group #1 are activated.

Case 3-2: K Value is in Unit of Sub-Slot.

Figure 11:
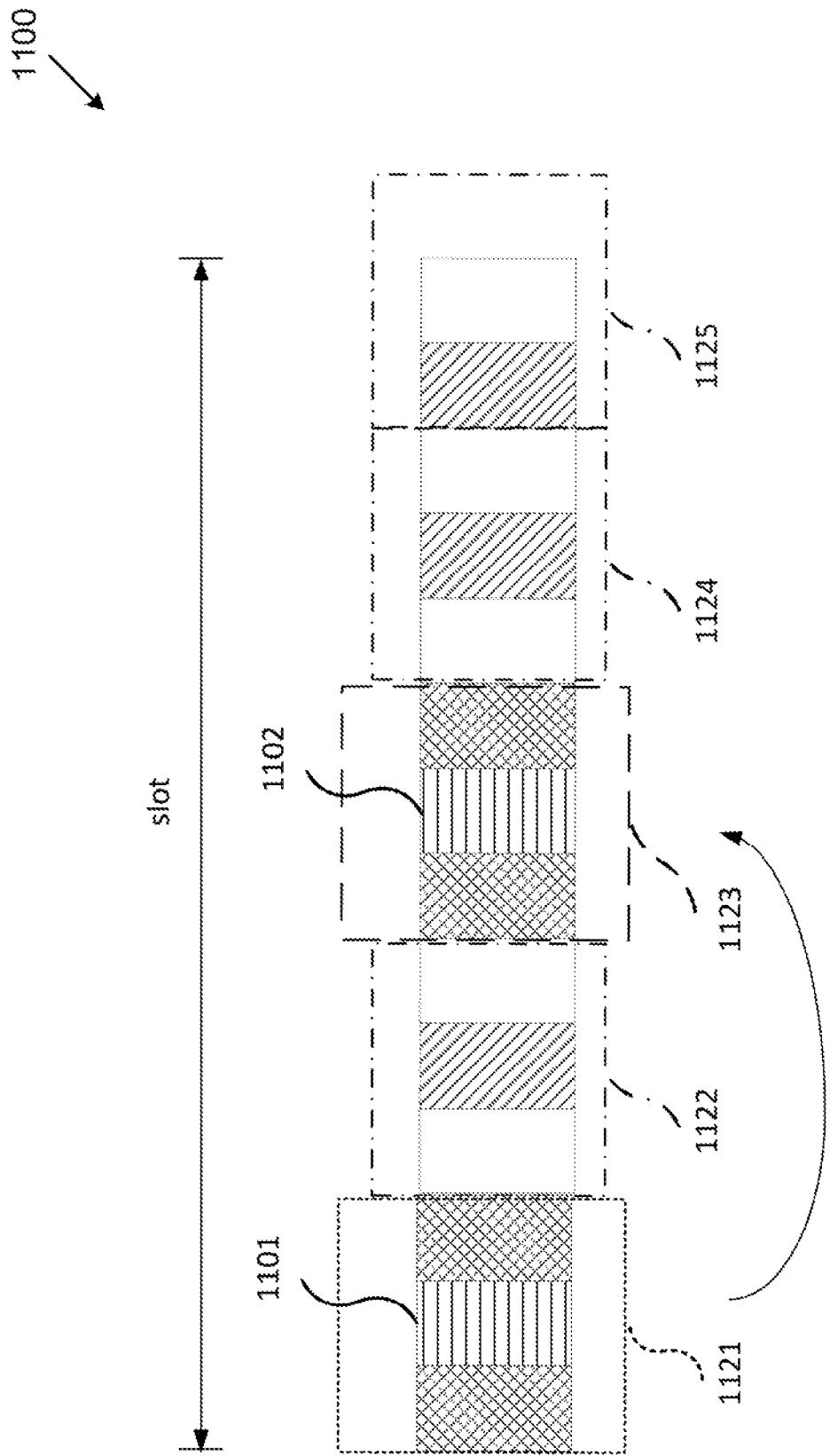
FIG. 11 includes a diagram illustrating an example cross sub-slot scheduling indication, according to an example implementation of the present application.

FIG. 11 includes a diagram 1100 illustrating an example cross sub-slot scheduling indication, according to an example implementation of the present application. In this example, one slot includes fourteen symbols. The period for scheduling URLLC data may be two symbols. PDCCH for scheduling eMBB data may occupy three consecutive symbols. In the example shown in FIG. 11, there may be two types of eMBB data scheduled in the same slot. For example, PDCCH 1101 may be used for scheduling the first type of eMBB data, and PDCCH 1102 may be used for scheduling the second type of eMBB data. The UE receives an activation indication in sub-slot 1121. K=2 and K value is in unit of sub-slot in this example, and thus the second upcoming sub-slot (e.g., sub-slot 1123) may be activated. In one implementation, the PDCCHs that schedule the same service type may be put into the same sub-slot group. For example, sub-slot 1121 may belong to sub-slot group #0, sub-slots 1122, 1124, 1125 may belong to sub-slot group #1, and sub-slot 1123 may belong to sub-slot group #2. Sub-slot group #1 may be deactivated in this example. As shown in FIG. 11, the indicator in the sub-slot group #0 may dynamically activate or deactivate the sub-slot group #2 immediately.

Case 4: BWP Switching Procedure when there is a Sub-Slot Configuration.

In one implementation, search space configurations may be different in different BWPs and sub-slot configurations may be applied per BWP. In one implementation, when the UE switches its active BWP in an activated sub-slot, the activation duration in the original active BWP may be terminated even though the activation duration (which may be indicated by a DCI or the sub-slot configuration) may be larger than the BWP switching time.

Figure 12:
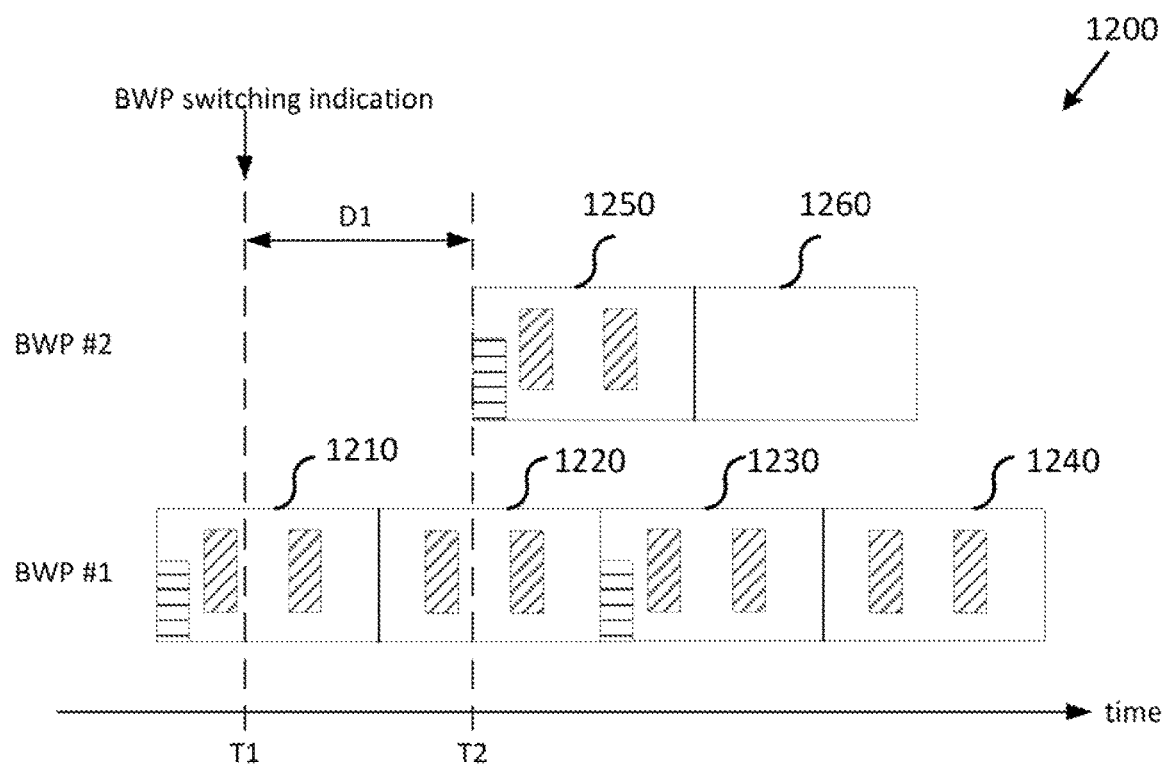
FIG. 12 includes a diagram illustrating an example bandwidth part (BWP) switching procedure, according to an example implementation of the present application.

FIG. 12 includes a diagram 1200 illustrating an example BWP switching procedure, according to an example implementation of the present application. The current active BWP of the UE is BWP #1 in the illustrated example. One slot includes two sub-slots (or PDCCH monitoring spans). The current activation duration is 2 slots, which may include sub-slots 1210, 1220, 1230 and 1240. The UE receives an indication for BWP switching at time T1 in sub-slot 1210. In this example, the UE may stop or terminate the current activation duration and then start switching to BWP #2. After certain delay time D1 (e.g., time spent on BWP switching), the active BWP of the UE may become BWP #2 at time T2. In one implementation, PDCCH monitoring may switch to a default deactivated mode after the BWP switching. For example, after the UE switches to BWP #2, sub-slot 1250 may be activated and sub-slot 1260 may be deactivated by default.

Figure 13:
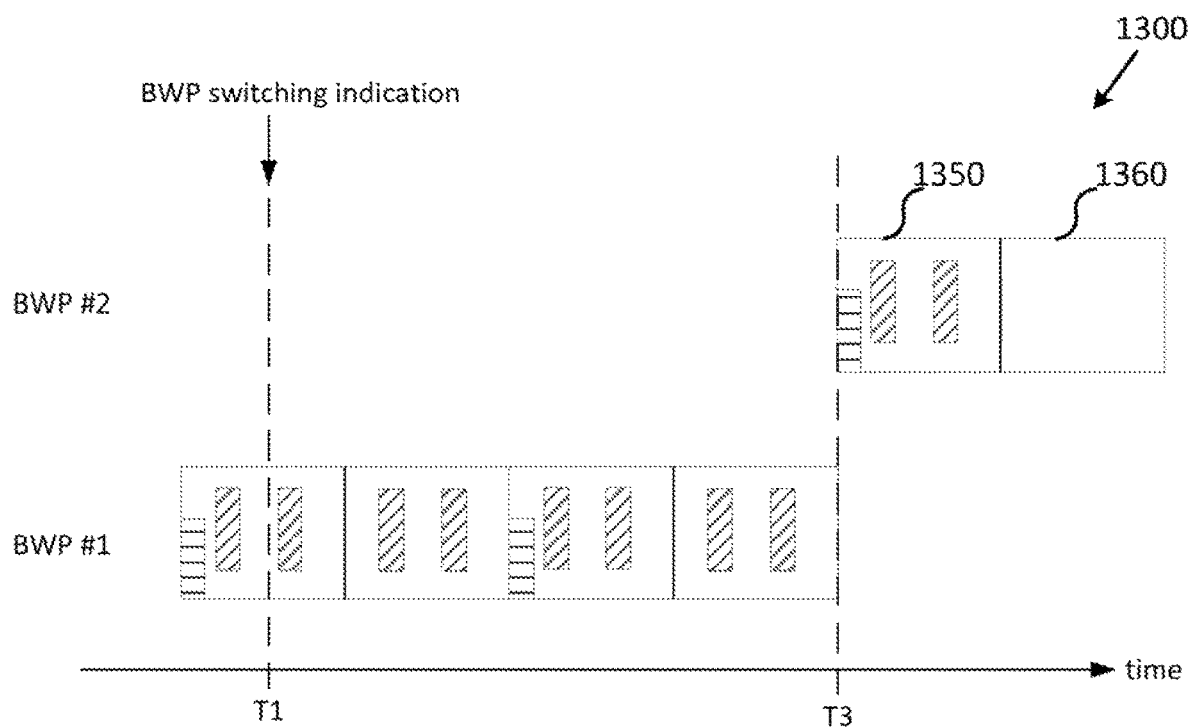
FIG. 13 includes a diagram illustrating another example BWP switching procedure, according to an example implementation of the present application.

FIG. 13 includes a diagram 1300 illustrating another example BWP switching procedure, according to an example implementation of the present application. Similar to the example shown in FIG. 12, the UE receives an indication for BWP switching at time T1 to switch from BWP #1 to BWP #2. In this example, the current activation duration is also 2 slots, and the UE may postpone BWP switching until the activation duration is over. For example, the UE may perform BWP switching at time T3. In one implementation, after the UE switches to BWP #2, sub-slot 1350 may be activated and sub-slot 1360 may be deactivated by default.

In one implementation, a DCI format may be used to indicate BWP switching and to give activation/deactivation command simultaneously. In one embodiment, if BWP switching is triggered by a DCI, the activation/deactivation command may be appended to the DCI. For example, referring to the example shown in FIG. 13, the UE may follow the activation/deactivation indication for PDCCH monitoring given by the DCI (which is received at time T1) after switching to BWP #2. In one implementation, if BWP switching is triggered by the expiration of bwp-Inactivity-Timer, the UE may deactivate the PDCCH for scheduling eMBB data upon the primary sub-slot implicitly, then eMBB data may not be served accordingly.

Figure 14:
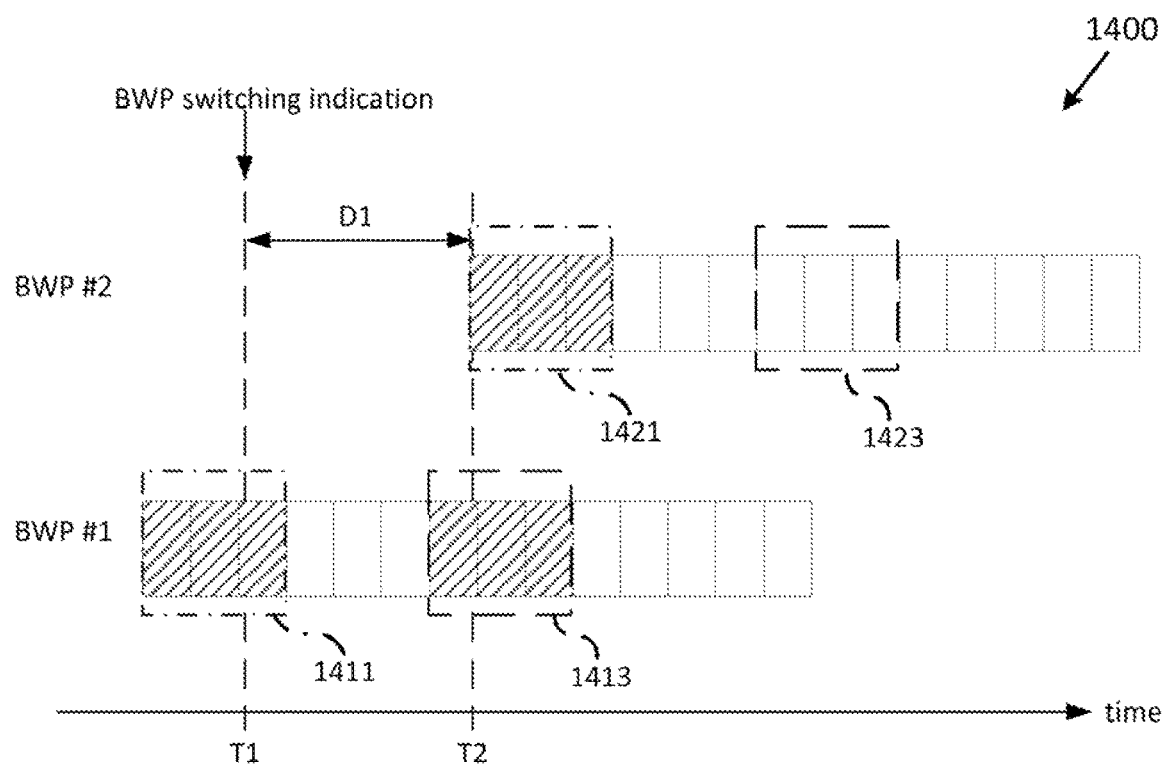
FIG. 14 includes a diagram illustrating an example BWP switching procedure when there is a dynamic indication within a slot, according to an example implementation of the present application.

FIG. 14 includes a diagram 1400 illustrating an example BWP switching procedure when there is a dynamic indication within a slot, according to an example implementation of the present application. The current active BWP of the UE is BWP #1. In this example, one slot may include five sub-slots (or PDCCH monitoring spans), and each sub-slot may include three symbols. Sub-slot 1411 and sub-slot 1413 may belong to different sub-slot groups. The UE receives an indication for BWP switching at time T1. In addition, the UE receives an activation indication in sub-slot 1411 with K=2 sub-slots. For example, the activation indication may intend to activate sub-slot 1413. In one implementation, instruction from the activation indication may be dropped or terminated by the UE. For example, the UE may not wait till the end of sub-slot 1413 to perform BWP switching. Instead, the UE may perform BWP switching right after receiving the BWP switching indication at time T1, ignoring the activation indication. After certain delay time D1 (e.g., time spent on BWP switching), the active BWP of the UE may become BWP #2 at time T2. In one implementation, PDCCH monitoring may switch to a default deactivated mode after the BWP switching. For example, after the UE switches to BWP #2, sub-slot 1421 may be activated and sub-slot 1423 may be deactivated by default.

Figure 15:
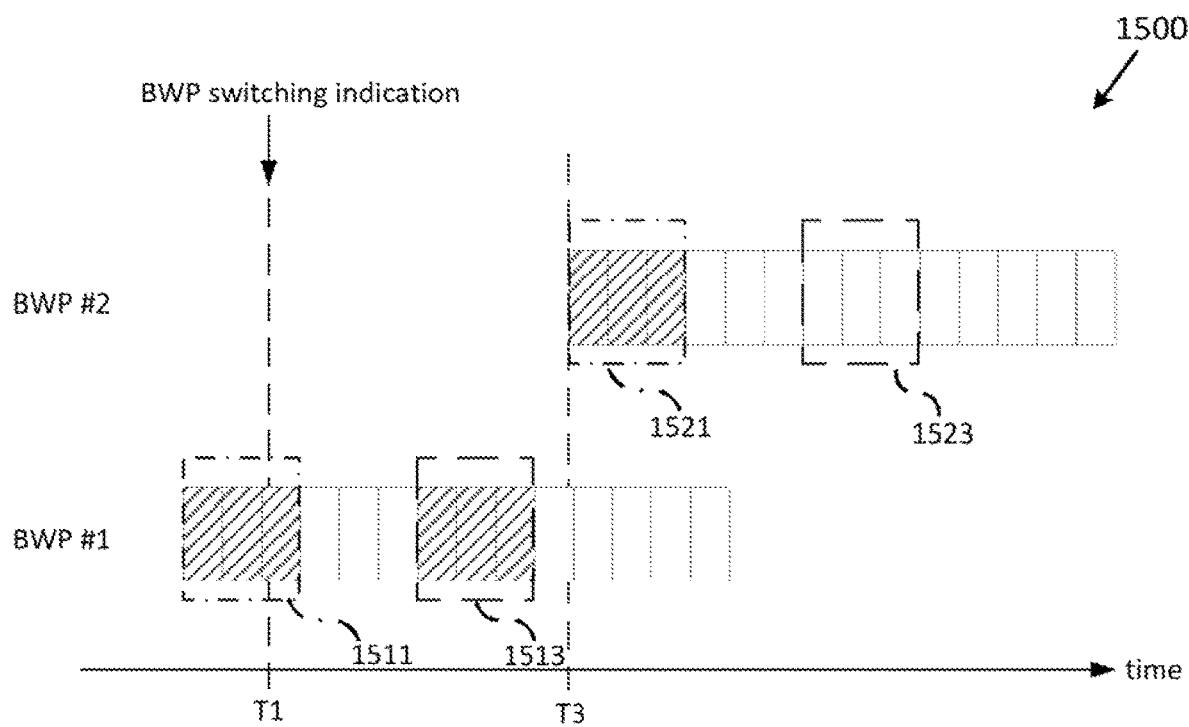
FIG. 15 includes a diagram illustrating another example BWP switching procedure when there is a dynamic indication within a slot, according to an example implementation of the present application.

FIG. 15 includes a diagram 1500 illustrating another example BWP switching procedure when there is a dynamic indication within a slot, according to an example implementation of the present application. Similar to the example shown in FIG. 14, the UE receives an indication for BWP switching at time T1 to switch from BWP #1 to BWP #2. The UE also receives an activation indication in sub-slot 1511 with K=2 sub-slots, preparing to activate sub-slot 1513. In one implementation, the UE may postpone BWP switching until the end of sub-slot 1513. For example, the active BWP of the UE may become BWP #2 at time T3, which happens after the end of sub-slot 1513. In one implementation, PDCCH monitoring may switch to a default deactivated mode after the BWP switching. For example, after the UE switches to BWP #2, sub-slot 1521 may be activated and sub-slot 1523 may be deactivated by default.

In one implementation, if a sub-slot indicator is to activate or deactivate a sub-slot in an upcoming slot with K value larger than the BWP switching delay time, the UE may drop this sub-slot indicator, as shown in FIG. 14. In another implementation, the UE may postpone BWP switching until activation/deactivation of the $(K+1)^{th}$ sub-slot/sub-slot group is finished, as shown in FIG. 15.

Case 5: Cross-Carrier Scheduling when there is a Sub-Slot Configuration.

In a cross-carrier scheduling scenario, there may be a scheduling cell and a scheduled cell. Since search space sets may be monitored in the scheduling cell upon cross-carrier scheduling, the activation/deactivation indication may take PDCCH monitoring occasions of the scheduled cell into account. In one implementation, not all PDCCHs for the scheduled cell are monitored on the scheduling cell.

For carrier aggregation (CA), PDCCH for scheduling different traffic associated with different CORESETs may overlap on at least one OFDM symbol, and these PDCCHs may have the same QCL-typeD. If they do not have the same QCL-typeD, the UE may monitor PDCCHs only in a CORESET on the active BWP of a cell with the lowest serving cell ID that corresponds to the CSS set or USS set with the lowest ID, which means a low priority ID may be dropped. In one implementation, if the PDCCH for scheduling different traffic associated with different CORESETs overlap on at least one OFDM symbol with various QCL-typeD in individual TCI states, the UE may monitor these PDCCHs simultaneously with capability of multiple spatial filters received. In one implementation, PDCCHs for scheduling URLLC data may be associated with the lowest serving cell ID that corresponds to the CSS set or USS set with the lowest ID, which means the URLLC service may have a higher priority than that of the eMBB service. In one implementation, PDCCHs for scheduling eMBB data may be associated with the lowest serving cell ID that corresponds to the CSS set or USS set with the lowest ID, which means the eMBB service may have a higher priority than that of the URLLC service in this case.

In the several implementations provided below, a sub-slot configuration may be configured to the scheduling cell. In addition, a slot may include two sub-slots (or PDCCH monitoring spans), where one sub-slot may be the primary sub-slot, and the other sub-slot may be the secondary sub-slot.

Case 5-1: All PDCCHs for the scheduled cell may be monitored on the scheduling cell. In this case, there may be no PDCCH monitored on the scheduled cell, and hence there may be no need to schedule a sub-slot configuration for the scheduled cell.

Case 5-1-1: If a PDCCH monitoring configuration for scheduling URLLC data is applied to one of the scheduling cells or the scheduled cells (e.g., one of the cells has higher BDs/CCEs limits than the other one), activation of the secondary sub-slot may be a default setting. Since the PDCCH for scheduling URLLC data may be monitored in the scheduling cell when one of the cells wants to transmit the URLLC data, sub-slots (where PDCCH for scheduling URLLC data is located) in the scheduling cell may be activated. In this case, the limit of CCEs/BDs may be counted based on PDCCH monitoring for different component carriers (CC) on a serving cell. For example, the scheduling cell may be configured to monitor PDCCH for scheduling eMBB data for the scheduling cell and PDCCH for scheduling URLLC data for the scheduled cell. In one implementation, PDCCHs for different CCs may correspond to different CCE/BD limits on the scheduling cell. In one implementation, a serving cell, which may refer to the scheduling cell, may be configured with a PDCCH monitoring configuration having a higher priority and another PDCCH monitoring configuration having a lower priority simultaneously. The former PDCCH monitoring configuration may be associated with the serving cell scheduling eMBB data, and the latter PDCCH monitoring configuration may be associated with the serving cell scheduling URLLC data.

Case 5-1-2: If the same PDCCH monitoring configuration is applied to the scheduling cells and the scheduled cells, an activation/deactivation status may depend on the type of the PDCCH monitoring configuration. When the PDCCH monitoring configuration for the URLLC service is applied to both the scheduling cells and the scheduled cells, activation of the secondary sub-slot may be a default setting. When the PDCCH monitoring configuration for the eMBB service is applied to both the scheduling cells and the scheduled cells, deactivation of the secondary sub-slot may be a default setting.

Case 5-2: All PDCCHs for scheduling URLLC data may be monitored on the scheduling cell. PDCCHs of the scheduled cell for scheduling eMBB data may be monitored on the scheduled cell. In one implementation, a sub-slot configuration may be configured to the scheduled cell in advance because URLLC data may be scheduled on the scheduled cell.

Case 5-2-1: Activation of sub-slot may be a default setting for the scheduling cell, and deactivation of sub-slot may be a default setting for the scheduled cell.

Case 5-2-2: Activation of sub-slot may be a default setting for the scheduling cell, and activation of sub-slot may be a default setting for the scheduled cell as well.

Case 5-3: All PDCCHs for scheduling eMBB data may be monitored on the scheduling cell. PDCCHs of the scheduled cell for scheduling URLLC data may be monitored on the scheduled cell. In one implementation, a sub-slot configuration may be configured to the scheduled cell in advance because eMBB data may be scheduled on the scheduled cell.

Case 5-3-1: Activation of sub-slot may be a default setting for the scheduling cell, and deactivation of sub-slot may be a default setting for the scheduled cell.

Case 5-3-2: Activation of sub-slot may be a default setting for the scheduling cell, and activation of sub-slot may be a default setting for the scheduled cell as well.

In one implementation, when deactivation of the scheduled cells occurs, the activation/deactivation indication may be rescheduled, and the sub-slot configuration may be reconfigured.

In one implementation, the activation/deactivation indication may be carried in a MAC CE, as mentioned in Case 1 and an example MAC CE shown in FIG. 4. For cross carrier scheduling, a configured sub-slot may be activated and deactivated by:
  receiving the sub-slot activation/deactivation MAC CE on the scheduling cell;
  configuring subslotDeactivationTimer per configured BWP or per serving cell.

Figure 16:
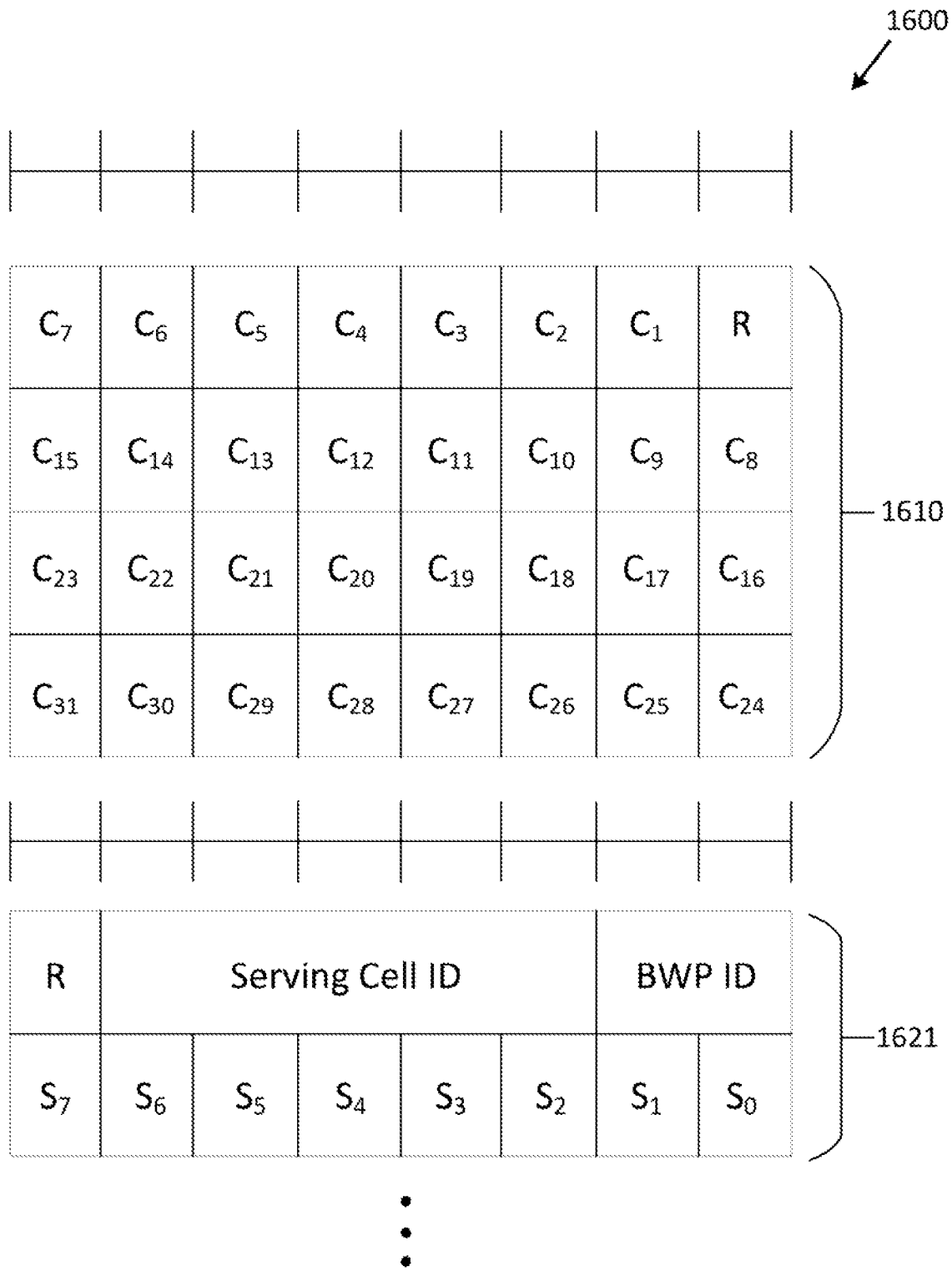
FIG. 16 includes a diagram illustrating an example activation/deactivation MAC CE for carrier aggregation (CA), according to an example implementation of the present application.

FIG. 16 includes a diagram 1600 illustrating an example activation/deactivation MAC CE for CA, according to an example implementation of the present application. One MAC CE 1610 may indicate the status of sub-slot function of each serving cell. Another MAC CE 1621 (which is similar to the one shown in FIG. 4) may indicate the slot configuration for a BWP and a serving cell. There may be other MAC CEs similar to MAC CE 1621 to indicate the slot configuration for another BWP or another serving cell.

In one implementation, if there is a secondary cell (SCell) configured with an SCellIndex i, the field $C_i$ (where i is a positive integer) may indicate an activated status of the sub-slot function of the SCell with SCellIndex i. Otherwise, a MAC entity of the UE may ignore the field C. The field $C_i$ may be set to '1' to indicate that the SCell with SCellIndex i applies sub-slot configuration. The field $C_i$ may be set to '0' to indicate that the SCell with SCellIndex i does not apply sub-slot configuration. In one implementation, the serving cell i with $C_i$ equal to 1 may further check another MAC CE (e.g., MAC CE 1621) to determine which sub-slot/sub-slot group is activated.

Figure 17:
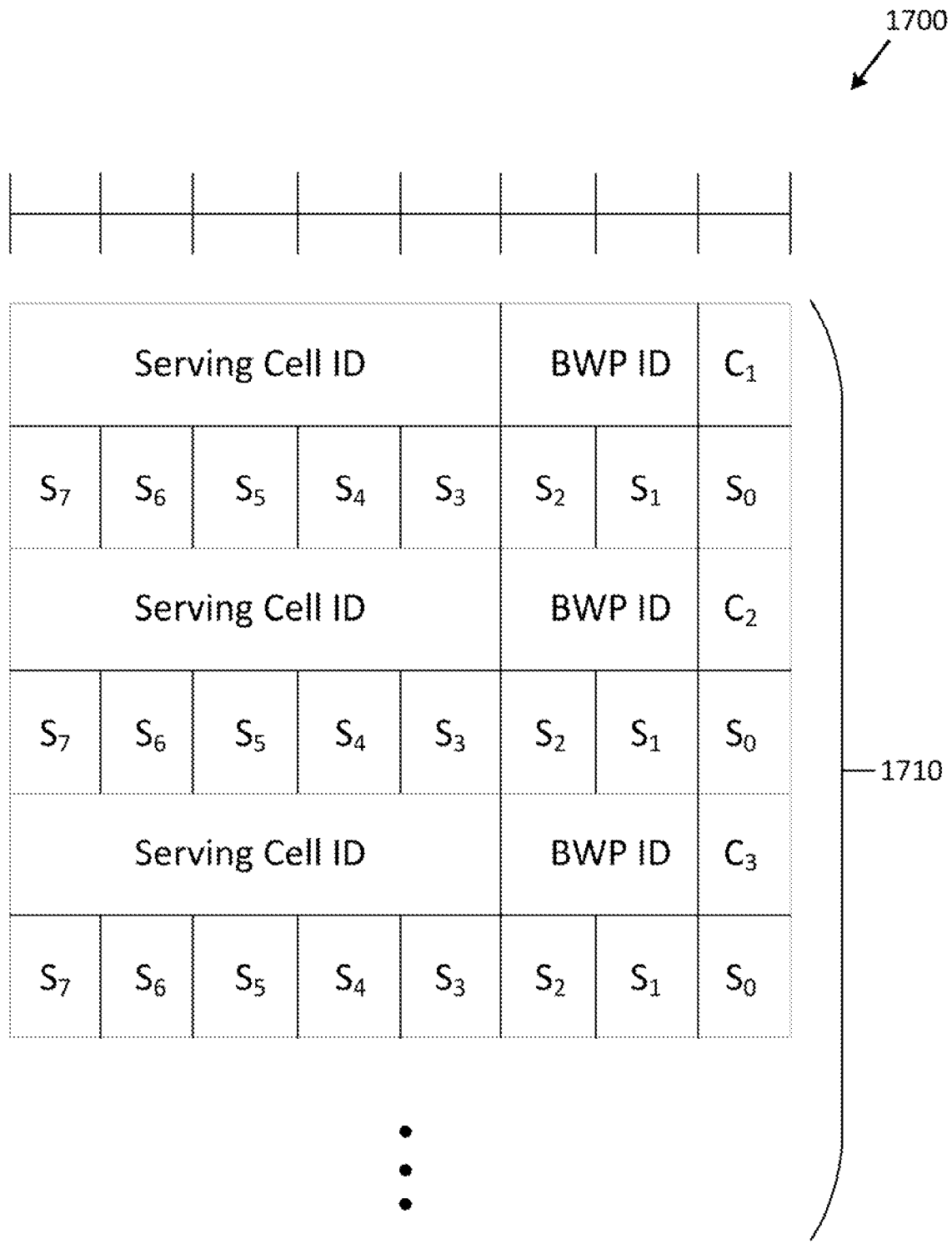
FIG. 17 includes a diagram illustrating another example activation/deactivation MAC CE for CA, according to an example implementation of the present application.

FIG. 17 includes a diagram 1700 illustrating another example activation/deactivation MAC CE for CA, according to an example implementation of the present application. One MAC CE 1710 may indicate the status of sub-slot function and the slot configuration for each serving cell. For each serving cell, the cell may check the status at the first few bits, then further check the slot configuration in the next few bits.

Figure 18:
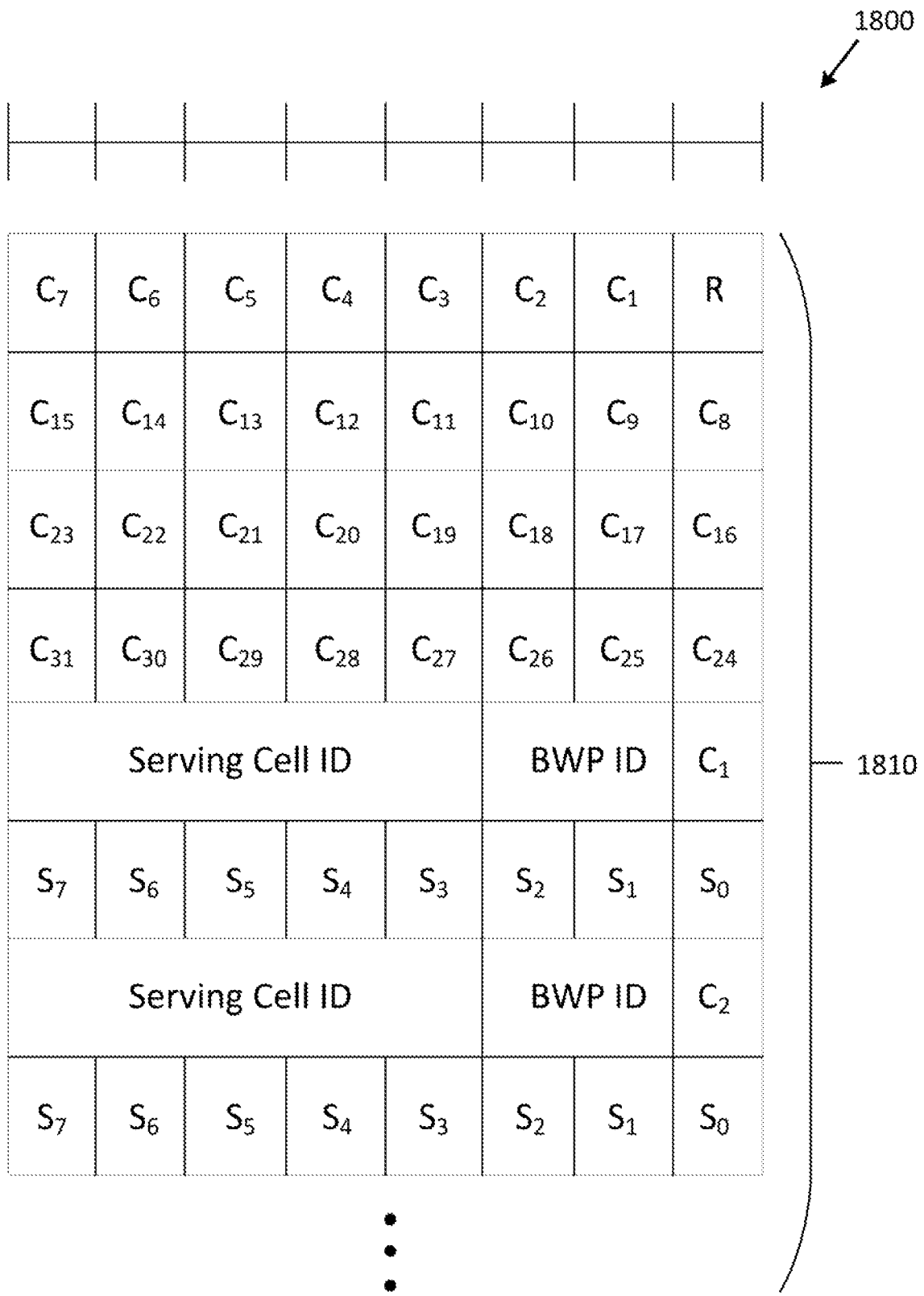
FIG. 18 includes a diagram illustrating another example activation/deactivation MAC CE for CA, according to an example implementation of the present application.

FIG. 18 includes a diagram 1800 illustrating another example activation/deactivation MAC CE for CA, according to an example implementation of the present application. Similar to the example shown in FIG. 17, one MAC CE 1810 may indicate the status of sub-slot function and the slot configuration for each serving cell. For each serving cell, the cell may check the status at the first few bits, then further check the slot configuration in the next few bits.

In one implementation, a method performed by a MAC entity of a UE may be as described in the following Table 5:

TABLE 5

The MAC entity may:
1>if a sub-slot activation/deactivation MAC CE for activating the sub-slot is received
  2>activate the sub-slot; apply normal sub-slot operation including:
    3>PDCCH monitoring in the sub-slot;
  2>start or restart the subslotDeactivationTimer associated with the BWP or the cell
1>else if a sub-slot activation/deactivation MAC CE for deactivating the sub-slot is received; or
1>if the subslotDeactivationTimer associated with the BWP or the cell expires:
  2>deactivate the sub-slot;
  2>stop the subslotDeactivationTimer associated with the BWP or the cell;
1>if PDCCH is monitored in the secondary sub-slot on the scheduling cell:
  2>if any PDCCH for the scheduled cell is monitored on the scheduling cell:
    3>restart the subslotDeactivationTimer associated with the BWP or the cell of the scheduling cell and the scheduled cell;

TABLE 5-continued

1>if the sub-slot is deactivated:
  2>skip monitoring the PDCCH in the sub-slot.

In one implementation, the activation/deactivation indication may be carried in a DCI format, as mentioned in Case 2. In one implementation, a UE may receive an explicit indicator in the DCI on the primary sub-slot to dynamically activate/deactivate the secondary sub-slot. The indicator may be scheduled on the scheduling cell and/or the scheduled cell.

In one implementation, an indicator in the DCI on the scheduling cell may indicate the activation/deactivation of sub-slots on both of the scheduling cell and the scheduled cell.

In one implementation, an indicator in the DCI on the scheduling cell may only indicate the activation/deactivation of sub-slots on the scheduling cell.

In one implementation, an indicator in the DCI on the scheduled cell may indicate the activation/deactivation of sub-slots on both of the scheduling cell and the scheduled cell. Sub-slots on the scheduling cell may be associated with the PDCCH monitoring for scheduling data on the scheduled cell.

In one implementation, an indicator in the DCI on the scheduled cell may only indicate the activation/deactivation of sub-slots on the scheduled cell.

In one implementation, cross slot (or sub-slot) scheduling indication of activation/deactivation and a K value may be used, as mentioned in Case 3. In one implementation, when the $(K+1)^{th}$ slot/sub-slot needs to schedule URLLC data for the scheduled cell, the indicator in the current sub-slot on the scheduling cell may be an activation indication.

In one implementation, an indicator in the DCI on the scheduling cell may indicate the activation/deactivation of sub-slots on both of the scheduling cell and the scheduled cell. In one implementation, K value may be split to multiple values (e.g., there may be multiple K values) associated with different cells to indicate activation/deactivation of sub-slots. In one implementation, the same K value may be applied to different cells. In one implementation, K value in the DCI may only indicate the sub-slot referring to the same cell. For example, although the DCI for scheduling data on the scheduled cell is monitored on the scheduling cell, K value in this DCI may only indicate the activation/deactivation of sub-slots associated with the scheduled cell.

In one implementation, an indicator in the DCI on the scheduling cell may only indicate the activation/deactivation of sub-slots on the scheduling cell. K value may be only applied to the sub-slots on the scheduling cell.

In one implementation, an indicator in the DCI on the scheduled cell may indicate the activation/deactivation of sub-slots on both of the scheduling cell and the scheduled cell. Sub-slots on the scheduling cell may be associated with the PDCCH monitoring for scheduling data on the scheduled cell. In one implementation, K value may be split to multiple values (e.g., there may be multiple K values) associated with different cells to indicate activation/deactivation of sub-slots. In one implementation, the same K value may be applied to different cells. In one implementation, K value in the DCI may only indicate the sub-slot referring to the same cell. For example, although the DCI for scheduling data on the scheduled cell is monitored on the scheduling cell, K value in this DCI may only indicate the activation/deactivation of sub-slots associated with the scheduled cell.

In one implementation, an indicator in the DCI on the scheduled cell may only indicate the activation/deactivation of sub-slots on the scheduled cell. K value may be only applied to the sub-slots on the scheduled cell.

In one implementation, when deactivation of the scheduled cell happens within K slots (or sub-slots) after receiving an activation/deactivation indication, the activation/deactivation indication (e.g., for a sub-slot group) may be rescheduled, and the sub-slot configuration may be reconfigured.

It should be noted the sub-slot configuration and relative activation/deactivation mechanisms described above may be applied to not only the URLLC/eMBB coexistence scenario but also some other use cases, such as multiple slicing (e.g., service types) with separate PDCCH monitoring.

Figure 19:
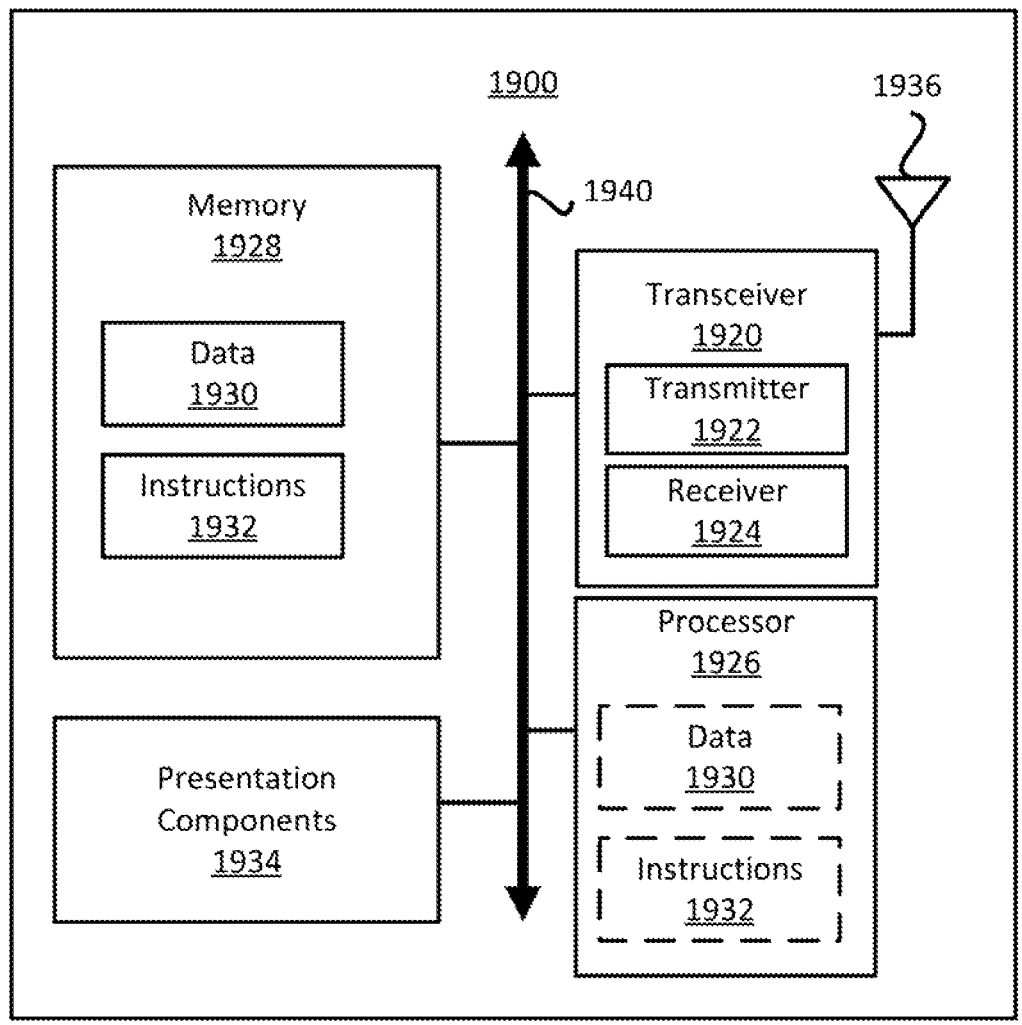
FIG. 19 is a block diagram illustrating a node for wireless communication according to various aspects of the present application.

FIG. 19 is a block diagram illustrating a node for wireless communication, in accordance with various aspects of the present application. As shown in FIG. 19, a node 1900 may include a transceiver 1920, a processor 1928, a memory 1934, one or more presentation components 1938, and at least one antenna 1936. The node 1900 may also include an RF spectrum band module, a base station (BS) communications module, a network communications module, and a system communications management module, Input/Output (I/O) ports, I/O components, and power supply (not explicitly shown in FIG. 19). Each of these components may be in communication with each other, directly or indirectly, over one or more buses 1940. In one implementation, the node 1900 may be a UE or a base station that performs various functions described herein, for example, with reference to FIGS. 1 through 18.

The transceiver 1920 having a transmitter 1922 (e.g., transmitting/transmission circuitry) and a receiver 1924 (e.g., receiving/reception circuitry) may be configured to transmit and/or receive time and/or frequency resource partitioning information. In some implementations, the transceiver 1920 may be configured to transmit in different types of subframes and slots including, but not limited to, usable, non-usable and flexibly usable subframes and slot formats. The transceiver 1920 may be configured to receive data and control channels.

The node 1900 may include a variety of computer-readable media. Computer-readable media may be any available media that may be accessed by the node 1900 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or data.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1934 may include computer-storage media in the form of volatile and/or non-volatile memory. The memory 1934 may be removable, non-removable, or a combination thereof. Example memory includes solid-state memory, hard drives, optical-disc drives, and etc. As illustrated in FIG. 19, The memory 1934 may store computer-readable, computer-executable instructions 1932 (e.g., software codes) that are configured to, when executed, cause the processor 1928 to perform various functions described herein, for example, with reference to FIGS. 1 through 18. Alternatively, the instructions 1932 may not be directly executable by the processor 1928 but be configured to cause the node 1900 (e.g., when compiled and executed) to perform various functions described herein.

The processor 1928 (e.g., having processing circuitry) may include an intelligent hardware device, e.g., a Central Processing Unit (CPU), a microcontroller, an ASIC, and etc. The processor 1928 may include memory. The processor 1928 may process the data 1930 and the instructions 1932 received from the memory 1934, and information through the transceiver 1920, the base band communications module, and/or the network communications module. The processor 1928 may also process information to be sent to the transceiver 1920 for transmission through the antenna 1936, to the network communications module for transmission to a core network.

One or more presentation components 1938 presents data indications to a person or other device. Examples of presentation components 1938 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A user equipment (UE) performing physical downlink control channel (PDCCH) monitoring, the UE comprising:
   one or more non-transitory computer-readable media storing one or more computer-executable instructions; and
   at least one processor coupled to the one or more non-transitory computer-readable media, the at least one processor configured to execute the computer-executable instructions to:
      perform the PDCCH monitoring in a first group associated with at least one first PDCCH monitoring configuration;
      receive, from a base station, downlink control information (DCI) comprising an indicator;
      perform the PDCCH monitoring in a second group associated with at least one second PDCCH monitoring configuration in response to reception of the indicator; and
      stop the PDCCH monitoring in the first group in response to the reception of the indicator,
      wherein a time period between receiving the DCI comprising the indicator and performing the PDCCH monitoring in the second group is associated with a delay value configured in a radio resource control (RRC) configuration.

2. The UE of claim 1, wherein the at least one processor is further configured to execute the one or more computer-executable instructions to:
   stop the PDCCH monitoring in the second group after a timer expires.

3. The UE of claim 2, wherein the timer is configured by the RRC configuration.

4. The UE of claim 1, wherein the indicator corresponds to an index of the second group.

5. The UE of claim 1, wherein each of the at least one first PDCCH monitoring configuration and the at least one second PDCCH monitoring configuration corresponds to a search space set identity (ID).

6. The UE of claim 1, wherein each of the first group and the second group corresponds to at least one PDCCH monitoring occasion within a configured duration.

7. A method for physical downlink control channel (PDCCH) monitoring performed by a user equipment (UE), the method comprising:
   performing the PDCCH monitoring in a first group associated with at least one first PDCCH monitoring configuration;
   receiving, from a base station, downlink control information (DCI) comprising an indicator;
   performing the PDCCH monitoring in a second group associated with at least one second PDCCH monitoring configuration in response to reception of the indicator; and
   stopping the PDCCH monitoring in the first group in response to the reception of the indicator,
   wherein a time period between receiving the DCI comprising the indicator and performing the PDCCH monitoring in the second group is associated with a delay value configured in a radio resource control (RRC) configuration.

8. The method of claim 7, further comprising:
   stopping the PDCCH monitoring in the second group after a timer expires.

9. The method of claim 8, wherein the timer is configured by the RRC configuration.

10. The method of claim 7, wherein the indicator corresponds to an index of the second group.

11. The method of claim 7, wherein each of the at least one first PDCCH monitoring configuration and the at least one second PDCCH monitoring configuration corresponds to a search space set identity (ID).

12. The method of claim 7, wherein each of the first group and the second group corresponds to at least one PDCCH monitoring occasion within a configured duration.

* * * * *